(12) United States Patent
Puzovic

(10) Patent No.: US 9,753,731 B1
(45) Date of Patent: Sep. 5, 2017

(54) METHODS AND SYSTEMS FOR ANALYZING AND IMPROVING PERFORMANCE OF COMPUTER CODES

(71) Applicant: The MathWorks, Inc., Natick, MA (US)

(72) Inventor: Milos Puzovic, Cambridge (GB)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/598,565

(22) Filed: Jan. 16, 2015

(51) Int. Cl.
*G06F 9/44* (2006.01)
*G06F 9/30* (2006.01)
*G06F 9/45* (2006.01)
*G06F 11/34* (2006.01)

(52) U.S. Cl.
CPC ........ *G06F 9/30181* (2013.01); *G06F 8/4441* (2013.01); *G06F 11/3495* (2013.01)

(58) Field of Classification Search
CPC .................................................. G06F 9/30181
USPC .......................................................... 717/131
See application file for complete search history.

(56) References Cited

U.S. PATENT DOCUMENTS

| | | | |
|---|---|---|---|
| 7,908,591 B1* | 3/2011 | Nell et al. ...................... | 717/130 |
| 7,962,901 B2* | 6/2011 | McCamant et al. .......... | 717/131 |
| 8,136,103 B2* | 3/2012 | Cascaval et al. ............. | 717/145 |
| 8,180,964 B1* | 5/2012 | Koh et al. ...................... | 711/118 |
| 8,225,291 B2* | 7/2012 | Chung et al. .................. | 717/125 |
| 8,375,368 B2* | 2/2013 | Tuck et al. .................... | 717/130 |
| 8,478,948 B2* | 7/2013 | Panchenko et al. .......... | 711/154 |
| 8,521,499 B1* | 8/2013 | Rompaey et al. ............. | 703/13 |
| 8,869,118 B2* | 10/2014 | Higgs et al. ................... | 717/130 |
| 8,898,646 B2* | 11/2014 | Codina et al. ................ | 717/130 |
| 2008/0209403 A1* | 8/2008 | Kimura ......................... | 717/125 |
| 2009/0083716 A1* | 3/2009 | Kimura ......................... | 717/129 |
| 2010/0223598 A1* | 9/2010 | Levine et al. ................. | 717/128 |

(Continued)

OTHER PUBLICATIONS

Pesterev et al., Locating cache performance bottlenecks using data profiling, ACM (2010) retrieved from http://dl.acm.org/citation.cfm?id=1755947 on Jan. 11, 2016.*

(Continued)

*Primary Examiner* — Lewis A Bullock, Jr.
*Assistant Examiner* — Theodore Herbert
(74) *Attorney, Agent, or Firm* — Pierce Atwood LLP; Kevin M. Farrell; Raza Sadr

(57) ABSTRACT

Methods and systems for analyzing and improving performance of computer codes. In some embodiments, a method comprises executing, via one or more processors, program code; collecting, via the one or more processors, one or more hardware dependent metrics for the program code; identifying an execution anomaly based on the one or more hardware dependent metrics, wherein the execution anomaly is present when executing the program code; and designing a modification of the program code via the one or more processors, wherein the modification addresses the execution anomaly. In some other embodiments, a method comprises collecting one or more hardware independent metrics for program code; receiving one or more characteristics of a computing device; and estimating, based on the one or more hardware independent metrics and the one or more characteristics, a duration for execution of the program code on the computing device.

18 Claims, 15 Drawing Sheets

(56) References Cited

U.S. PATENT DOCUMENTS

2014/0282435 A1* 9/2014 Fukuda et al. ............... 717/131

OTHER PUBLICATIONS

Heckmann et al., Worst-Case Execution Time Prediction by Static Program Analysis, AbsInt (2012) retrieved from https://web.archive.org/web/20120717033511/http://www.absint.com/aiT_WCET.pdf on Jan. 11, 2016.*
Flynn, "Computer Architecture: Pipelined and Parallel Processor Design," Jones and Bartlett Publishers, Inc., USA, 1st Edition, pp. 384-417, 1995.
Hoste et al., "Microarchitecture-Independent Workload Characterization," IEEE Micro, 27(3):63-72 (2007).
Lee, "Computing Needs Time," Commun. ACM, 52(5):70-79 (2009).
Shaw, "Reasoning About Time in Higher-Level Language Software," IEEE Trans. Softw. Eng., 15(7):875-889 (1989).
Thiebaut and Stone, "Footprints in the cache," ACM Transactions on Computer Systems 5(4):305-329 (1987).
Weissman, "Performance counters and state sharing annotations: a unified approach to thread locality," In Proceedings of the eighth international conference on Architectural support for programming languages and operating systems (ASPLOS VIII). ACM, New York, NY, USA, 127-138 (1998).
Wilhelm et al., "Computation Takes Time, But How Much?," Commun. ACM, 57(2):94-103 (2014).

* cited by examiner

| PROCESSOR | AVAILABLE HW COUNTERS |
|---|---|
| ULTRA SPARK II | 2 |
| PENTIUM III | 2 |
| ARM11 | 2 |
| AMD ATHLON | 4 |
| IA-64 | 4 |
| ARM CORTEX-A5 | 2 |
| ARM CORTEX-A8 | 4 |
| ARM CORTEX-A9 MPCORE | 6 |
| POWER 4 | 8 |
| PENTIUM 4 | 18 |

CONDITIONAL BRANCHING:
PAPI_BR_CN    CONDITIONAL BRANCH INSTRUCTIONS
PAPI_BR_INS   BRANCH INSTRUCTIONS
PAPI_BR_MSP   CONDITIONAL BRANCH INSTRUCTIONS MISPREDICTED
PAPI_BR_NTK   CONDITIONAL BRANCH INSTRUCTIONS NOT TAKEN
PAPI_BR_PRC   CONDITIONAL BRANCH INSTRUCTIONS CORRECTLY PREDICTED
PAPI_BR_TKN   CONDITIONAL BRANCH INSTRUCTIONS TAKEN
PAPI_BR_UCN   UNCONDITIONAL BRANCH INSTRUCTIONS
PAPI_BRU_IDL  CYCLES BRANCH UNITS ARE IDLE
PAPI_BTAC_M   BRANCH TARGET ADDRESS CACHE MISSES

CACHE REQUESTS:
PAPI_CA_CLN   REQUESTS FOR EXCLUSIVE ACCESS TO CLEAN CACHE LINE
PAPI_CA_INV   REQUESTS FOR CACHE LINE INVALIDATION
PAPI_CA_ITV   REQUESTS FOR CACHE LINE INTERVENTION
PAPI_CA_SHR   REQUESTS FOR EXCLUSIVE ACCESS TO SHARED CACHE LINE
PAPI_CA_SNP   REQUESTS FOR A SNOOP

CONDITIONAL STORE:
PAPI_CSR_FAL  FAILED STORE CONDITIONAL INSTRUCTIONS
PAPI_CSR_SUC  SUCCESSFUL STORE CONDITIONAL INSTRUCTIONS
PAPI_CSR_TOT  TOTAL STORE CONDITIONAL INSTRUCTIONS

FLOATING POINT OPERATIONS:
PAPI_FAD_INS  FLOATING POINT ADD INSTRUCTIONS
PAPI_FDV_INS  FLOATING POINT DIVIDE INSTRUCTIONS
PAPI_FMA_INS  FMA INSTRUCTIONS COMPLETED
PAPI_FML_INS  FLOATING POINT MULTIPLY INSTRUCTIONS
PAPI_FNV_INS  FLOATING POINT INVERSE INSTRUCTIONS
PAPI_FP_INS   FLOATING POINT INSTRUCTIONS
PAPI_FP_OPS   FLOATING POINT OPERATIONS
PAPI_FP_STAL  CYCLES THE FP UNIT
PAPI_FPU_IDL  CYCLES FLOATING POINT UNITES ARE IDLE
PAPI_FSQ_INS  FLOATING POINT SQUARE ROOT INSTRUCTIONS
PAPI_SP_OPS   FLOATING POINT OPERATIONS EXECUTED; OPTIMIZED TO COUNT SCALED SINGLE PRECISION VECTOR OPERATIONS
PAPI_DP_OPS   FLOATING POINT OPERATIONS EXECUTED; OPTIMIZED TO COUNT SCALED DOUBLE PRECISION VECTOR OPERATIONS
PAPI_VEC_SP   SINGLE PRECISION VECTOR/SIMD INSTRUCTIONS
PAPI_VEC_DP   DOUBLE PRECISION VECTOR/SIMD INSTRUCTIONS

400

DATA ACCESS:
PAPI_LD_INS    LOAD INSTRUCTIONS
PAPI_LST_INS   LOAD/STORE INSTRUCTIONS COMPLETED
PAPI_LSU_IDL   CYCLES LOAD/STORE UNITS ARE IDLE
PAPI_MEM_RCY   CYCLES STALLED WAITING FOR MEMORY READS
PAPI_MEM_SCY   CYCLES STALLED WAITING FOR MEMORY ACCESSES
PAPI_MEM_WCY   CYCLES STALLED WAITING FOR MEMORY WRITES
PAPI_PRF_DM    DATA PREFETCH CACHE MISSES
PAPI_RES_STL   CYCLES STALLED ON ANY RESOURCE
PAPI_SR_INS    STORE INSTRUCTIONS
PAPI_STL_CCY   CYCLES WITH NO INSTRUCTIONS COMPLETED
PAPI_STL_ICY   CYCLES WITH NO INSTRUCTION ISSUE
PAPI_SYC_INS   SYNCHRONIZATION INSTRUCTIONS COMPLETED

TLB OPERATIONS:
PAPI_TLB_DM   DATA TRANSLATION LOOKASIDE BUFFER MISSES
PAPI_TLB_IM   INSTRUCTION TRANSLATION LOOKASIDE BUFFER MISSES
PAPI_TLB_SD   TRANSLATION LOOKASIDE BUFFER SHOOTDOWNS
PAPI_TLB_TL   TOTAL TRANSLATION LOOKASIDE BUFFER MISSES

INSTRUCTION COUNTING:
PAPI_FUL_CCY   CYCLES WITH MAXIMUM INSTRUCTIONS COMPLETED
PAPI_FUL_ICY   CYCLES WITH MAXIMUM INSTRUCTION ISSUE
PAPI_FXU_IDL   CYCLES INTEGER UNITS ARE IDLE
PAPI_HW_INT    HARDWARE INTERRUPTS
PAPI_INT_INS   INTEGER INSTRUCTIONS
PAPI_TOT_CYC   TOTAL CYCLES                              ⎤
PAPI_TOT_IIS   INSTRUCTIONS ISSUED                       ⎬ 402
PAPI_TOT_INS   INSTRUCTIONS COMPLETED                    ⎦
PAPI_VEC_INS   VECTOR/SIMD INSTRUCTIONS

CACHE ACCESS:
PAPI_L1_DCA   L1 DATA CACHE ACCESSES
PAPI_L1_DCH   L1 DATA CACHE HITS
PAPI_L1_DCM   L1 DATA CACHE MISSES
PAPI_L1_DCR   L1 DATA CACHE READS
PAPI_L1_DCW   L1 DATA CACHE WRITES
PAPI_L1_ICA   L1 INSTRUCTION CACHE ACCESSES
PAPI_L1_ICH   L1 INSTRUCTION CACHE HITS
PAPI_L1_ICM   L1 INSTRUCTION CACHE MISSES
PAPI_L1_ICR   L1 INSTRUCTION CACHE READS
PAPI_L1_ICW   L1 INSTRUCTION CACHE WRITES
PAPI_L1_LDM   L1 LOAD MISSES
PAPI_L1_STM   L1 STORE MISSES
PAPI_L1_TCA   L1 TOTAL CACHE ACCESSES
PAPI_L1_TCH   L1 TOTAL CACHE HITS
PAPI_L1_TCM   L1 TOTAL CACHE MISSES
PAPI_L1_TCR   L1 TOTAL CACHE READS
PAPI_L1_TCW   L1 TOTAL CACHE WRITES
PAPI_L2_DCA   L2 DATA CACHE ACCESSES
PAPI_L2_DCH   L2 DATA CACHE HITS
PAPI_L2_DCM   L2 DATA CACHE MISSES
PAPI_L2_DCR   L2 DATA CACHE READS
PAPI_L2_DCW   L2 DATA CACHE WRITES
PAPI_L2_ICA   L2 INSTRUCTION CACHE ACCESSES
PAPI_L2_ICH   L2 INSTRUCTION CACHE HITS
PAPI_L2_ICM   L2 INSTRUCTION CACHE MISSES
PAPI_L2_ICR   L2 INSTRUCTION CACHE READS
PAPI_L2_ICW   L2 INSTRUCTION CACHE WRITES
PAPI_L2_LDM   L2 LOAD MISSES
PAPI_L2_STM   L2 STORE MISSES
PAPI_L2_TCA   L2 TOTAL CACHE ACCESSES
PAPI_L2_TCH   L2 TOTAL CACHE HITS
PAPI_L2_TCM   L2 TOTAL CACHE MISSES
PAPI_L2_TCR   L2 TOTAL CACHE READS
PAPI_L2_TCW   L2 TOTAL CACHE WRITES
PAPI_L3_DCA   L3 DATA CACHE ACCESSES
PAPI_L3_DCH   L3 DATA CACHE HITS
PAPI_L3_DCM   L3 DATA CACHE MISSES
PAPI_L3_DCR   L3 DATA CACHE READS
PAPI_L3_DCW   L3 DATA CACHE WRITES
PAPI_L3_ICA   L3 INSTRUCTION CACHE ACCESSES
PAPI_L3_ICH   L3 INSTRUCTION CACHE HITS
PAPI_L3_ICM   L3 INSTRUCTION CACHE MISSES
PAPI_L3_ICR   L3 INSTRUCTION CACHE READS
PAPI_L3_ICW   L3 INSTRUCTION CACHE WRITES
PAPI_L3_LDM   L3 LOAD MISSES
PAPI_L3_STM   L3 STORE MISSES
PAPI_L3_TCA   L3 TOTAL CACHE ACCESSES
PAPI_L3_TCH   L3 TOTAL CACHE HITS
PAPI_L3_TCM   L3 TOTAL CACHE MISSES
PAPI_L3_TCR   L3 TOTAL CACHE READS
PAPI_L3_TCW   L3 TOTAL CACHE WRITES

METHODS AND SYSTEMS FOR ANALYZING AND IMPROVING PERFORMANCE OF COMPUTER CODES

BACKGROUND

Many areas of technology utilize processors that run computer code. Such computer codes may execute applications needed for operating various machines such as computers, appliances, vehicles, aircraft, and so on. These applications are often performance sensitive, that is, require efficiency and consistency of execution in order for users to benefit from using the applications. That is, the applications need the processor to perform its function based on specific requirements and within some tolerance level for fluctuations. For instance, the application may need the processor to complete its operation below a maximum allowed time threshold, and that the time duration fluctuate less than a maximum allowed variance. An automobile, for example, may require its components to react consistently and within a specific time frame when the driver makes sudden changes, such as, braking or steering. As another example, an aircraft may require its processors to perform a precise and quick calculation of the g-force exerted on the pilot, to protect the pilot from being exposed to a high g-force for an extended period of time.

When one or more processors execute program code, however, the characteristics of the execution may vary because of some factors. For example, the execution time for a task may vary based on the amount of processor resources that are used by other tasks that the same processor simultaneously performs. The resource usage may be affected by both internal and external factors. Internal factors may include an execution pattern of a program code, such as the amount of memory allocated to the program code. The user may be able to determine some of the internal factors before executing the code or to control some of the internal factors while executing the code. External factors, on the other hand, may include factors that the user cannot determine or control during execution. Some of the external factors, such as execution of branch prediction algorithms, may depend on the hardware. The external factors may thus result in outcomes that are unexpected by the user.

Therefore, execution of a program code may suffer from unpredictability and uncertainty. A user may not be able to expect consistency or predictability of performance among repeated executions of even the same program code on the same hardware. Moreover, a user may not be able to predict the performance of a program code on a new hardware system, even if the user measures the performance on a previous hardware system. For example, executing a program code on a new processor with twice the speed of a previous processor may not result in reducing the total execution time by half.

Such uncertainties and unpredictabilities may cause practical or financial hardships to users. For instance, in some performance sensitive applications, a user may err on the side of caution by using expensive hardware that has a much higher speed than the minimum required hardware for meeting the performance requirements. Alternatively, a user may not be able to predict the performance of the execution within some uncertainty limits. Adding predictability and certainty to the execution of a program code will reduce such hardships.

BRIEF DESCRIPTION OF THE DRAWINGS

FIG. 4 shows a list of pre-set events for Performance Application Programming Interface (PAPI) as used in some embodiments.

DETAILED DESCRIPTION

Figure 1A:
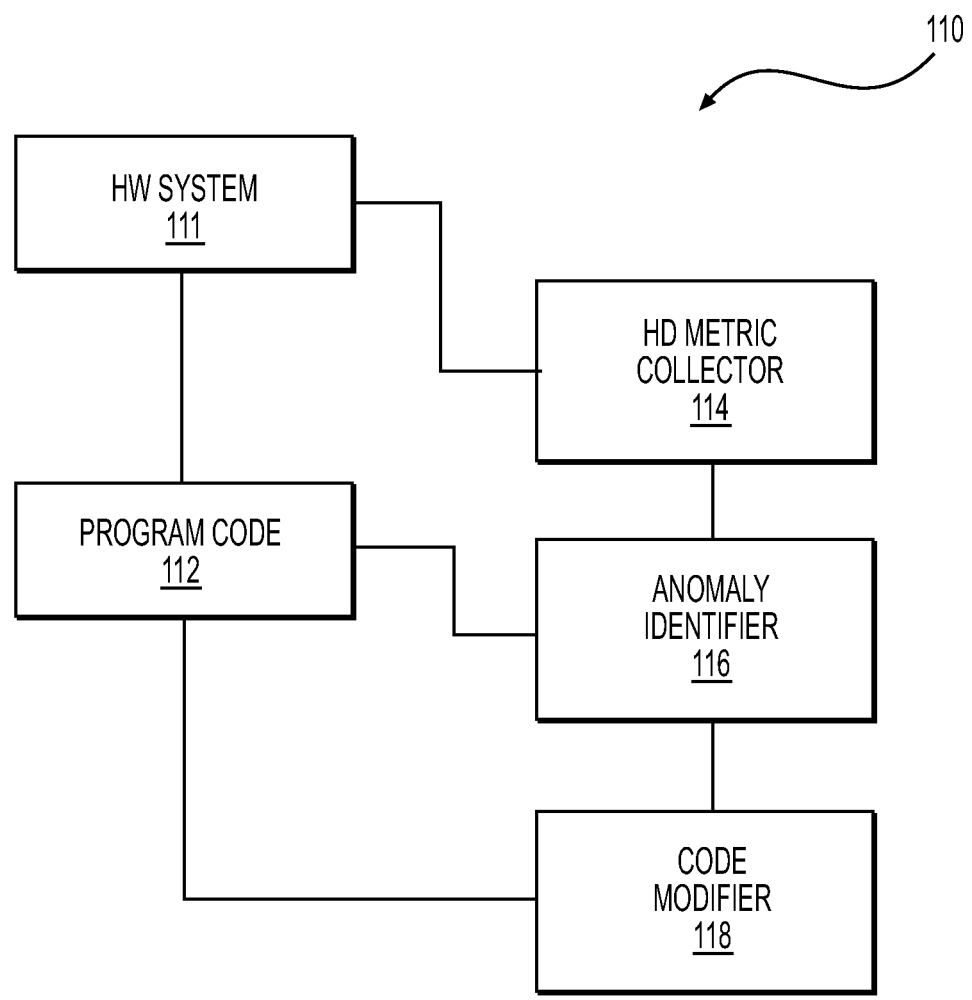
FIG. 1A shows a block diagram for an anomaly detection system according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Some embodiments employ hardware level optimizations to enhance the performance of program code. Hardware level optimizations often speed up the execution of program code. But in some cases, an execution anomaly may occur, in which a hardware optimization results in slowing down the execution. Such execution anomalies may result in performance uncertainties that cannot be detected by only analyzing the program code, but require understanding hardware level optimizations.

Some embodiments address the uncertainties of executing a program code by using hardware dependent techniques. The hardware dependent techniques may collect hardware dependent (HD) metrics related to the execution of the program code and accordingly identify one or more performance issues. A performance issue may include an occurrence during the execution of a section of code that delays completion of the execution of that section. A performance issue may include, for example, a cache miss or a branch misprediction. Some performance issues may result in execution anomalies. An execution anomaly may occur when removing a performance issue speeds up the execution of the related code section but delays the overall completion of a code. Such execution anomalies may thus result in uncertainty about how to improve the performance of code.

In some cases, an execution anomaly may occur when more than one performance issues occur during execution of code. The multiple performance issues may occur when executing the same or different sections of code. The execution anomaly may exist because the different performance issues affect each others, such that removing one performance issue causes or worsens the effect of another performance issue. In some embodiments, different performance issues are identified using HD metrics. Moreover, an execution anomaly may be detected by identifying that removing one type of performance issue creates or worsens the effects of another performance issue. Once an anomaly is identified, the code may be modified to remove or reduce the risk that the anomaly occurs. Such modification may then reduce the uncertainty in executing the program code.

Some embodiments identify and address execution anomalies using a hardware system that includes one or more processors. FIG. 1A shows a block diagram for an anomaly detection system 110 according to some embodiments. System 110 includes a hardware (HW) system 111, a program code 112, an HD metric collector 114, an anomaly identifier 116, and a code modifier 118. In various embodiments, one or more of the components of system 110 may include software applications. In some embodiments, parts or all of the functions of one or more of the components, such as anomaly identifier 116 or code modifier 118, may be performed by one or more users of system 110.

Hardware system 111 may include one or more computing devices that are configured to execute program code 112. HD metric collector 114 may be configured to collect one or more HD metrics. The HD metrics may be generated by hardware system 111 while executing code 112. Anomaly identifier 116 may receive the HD metrics and identify one or more execution anomalies. In some embodiments, anomaly identifier 116 may also access code 112.

Code modifier 118 receives information about the execution anomalies and modifies code 112 to address those anomalies. In some embodiments, a user may perform some or all of the modification of code 112 based on anomalies identified by anomaly identifier 116. The components of system 110 and their functionalities will be explained in more detail below.

Some embodiments address the unpredictability of executing a program code on new hardware systems. In particular, some embodiments collect information that may include hardware independent (HI) metrics, performance results from executing program code by a previous hardware system, or hardware characteristics of a new hardware system. Using the collected information, these embodiments can predict the performance of executing the program code on the new hardware system even before the code is executed on that system.

Figure 1B:
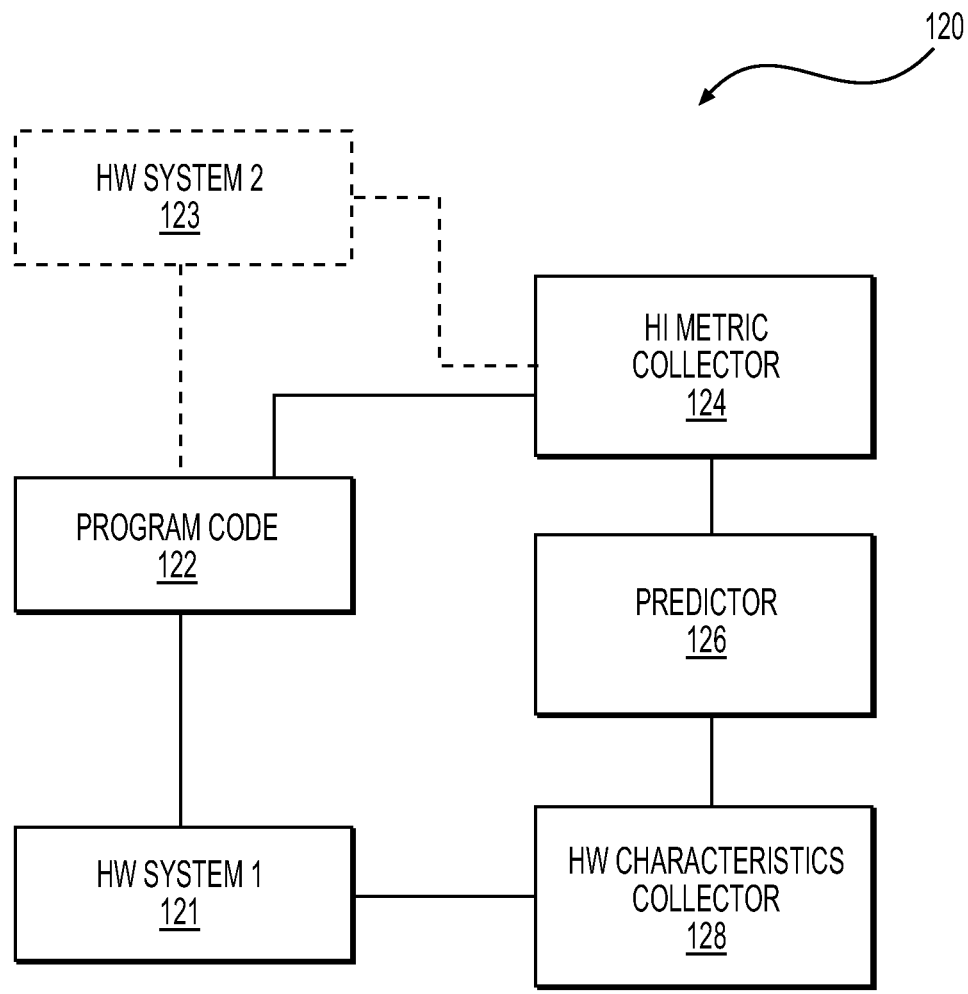
FIG. 1B shows a block diagram for an execution predictor system according to some embodiments.

Some embodiments predict execution behavior of program code based on some HI metrics. FIG. 1B shows a block diagram for an execution predictor system 120 according to some embodiments. System 120 includes program code 122, a hardware system 121, a HI metric collector 124, a predictor 126, and a hardware characteristics collector 128. System 120 may also include a second hardware system 123. In various embodiments, one or more of the components of system 120 may include software applications. In some embodiments, parts or all of the functions of a component such as predictor 126 may be performed by one or more users of system 120.

Hardware systems 121 and 123 may each include one or more computing devices that are configured to execute program code 122. HI metric collector 124 may be configured to collect one or more HI metrics. The HI metrics may be generated statically by analyzing code 122 or may be generated dynamically during execution of code 122 via hardware system 123. Hardware characteristics collector 128, on the other hand, collects information about one or more hardware characteristics of hardware system 121. Predictor 126 receives the HI metrics and the hardware characteristics of hardware system 121. In some embodiments, predictor 126 may also access and gather information about code 122. Based on the received information, predictor 126 predicts execution behavior, e.g., execution speed, of code 122 when executed by hardware system 121. The components of system 120 and their functionalities will be explained in more detail below.

Some embodiments analyze execution characteristics of a software application on a hardware system, e.g., a system that includes one or more devices such as a computing device. The software application may include one or more computer programs or computer codes. The execution characteristics may include one or more of the time duration, memory allocation, usage of particular instructions, frequency of function calls, or duration of function calls when executing the program code. In various embodiments, the execution characteristics may also include other characteristics that the hardware system can collect.

Some embodiments determine one or more execution characteristics of program code by inserting profilers in the program code. Such a profiler may measure an execution characteristic, such as execution duration, for a section of the program code. Various embodiments may use one or more profiling techniques such as instrumentation profiling and sampling profiling. Sample program code (1) shows an example of inserting a profiler in program code according to one embodiment.

Sample Program Code (1)

```
1  XIL_INTERFACE_ERROR_CODE   xilOutput (uint32_T xilFcnId, uint32_T
2  xilTID) {
3  /* Single In-the-Loop Component */
4  if(xilFcnId !=0) {
5  return XIL_INTERFACE_UNKNOWN_FCNID;
6  }
7  switch(xilTID) {
8  case 1:
9  start_my_timer( );
10 rtwdemo_sil_topmodel_step( );
11 end_my_timer( );
12 break;
13 default:
14 return XIL_INTERFACE_UNKNOWN_TID;
15 }
16 return XIL_INTERFACE_SUCCESS;
17 }
```

In sample program code (1), a profiler is inserted to find the duration of completing a function call "rtwdemo_sil_topmodel_step( )," at line 10. The profiler is inserted by adding two timer calls at lines 9 and 11, that is, before and after the function call. In particular, the timer call "start_my_timer" at line 9 starts the timer before the function is called at line 10. Moreover, the timer call "end_my_timer" at line 11 stops the timer after the function call of line 10 completes. The timer measurement may be stored for further use or analysis. Program code may include one or more sections. Further, for each section, one or more timers may be added to measure the execution time duration for that section. In some embodiments, inserting such function calls in program code to gather execution characteristics data is called profiling the program code or software profiling. Profiling, in general, may refer to using tools or techniques to record one or more execution characteristics of program code. In some embodiments, software profiling may include collecting some execution data from some underlying software, such as operating system software. Software profiling may use software based tools such as the above-discussed timer.

Software profiling program code may show that the execution characteristics of the program code may fluctuate, i.e., change, during one execution of the program code or between different executions of the program code. The fluctuations may result, among other things, from changes to internal state of the one or more processors that execute program code. These changes may result from internal factors such as execution of the program code, or from external factors such as execution of other program codes by the same processor.

Some embodiments profile program code using software profiling tools such as a CPU timer. The CPU timer may be associated with a processor or with a thread. Some embodiments use a software profiling tool such as time stamp counter (TSC). A time stamp counter may measure a duration in terms of number of cycles. In some embodiments, to utilize a TSC, an instruction "rdtsc" may be inserted in the program code. The "rdtsc" instruction returns a value of the TSC.

Some embodiments may use other types of software profiling tools. For example, in various embodiments, different software profiling tools may measure a variety of metrics such as execution time, memory usage, file system utilization, network utilization, etc. The memory usage may, for example, be reported as a percentage of a total available memory. In some embodiments, this metric is collected by making system calls to check an amount of memory that has been used at specific computer code points during execution of program code. The results may be reported back to a user or mapped to program points where measurements were taken. The metrics for file system utilization or network utilization may be collected and recorded in similar manners. In some embodiments, the profiling metrics may include some counts, such as a number of times that a function has been called.

Figure 2A:
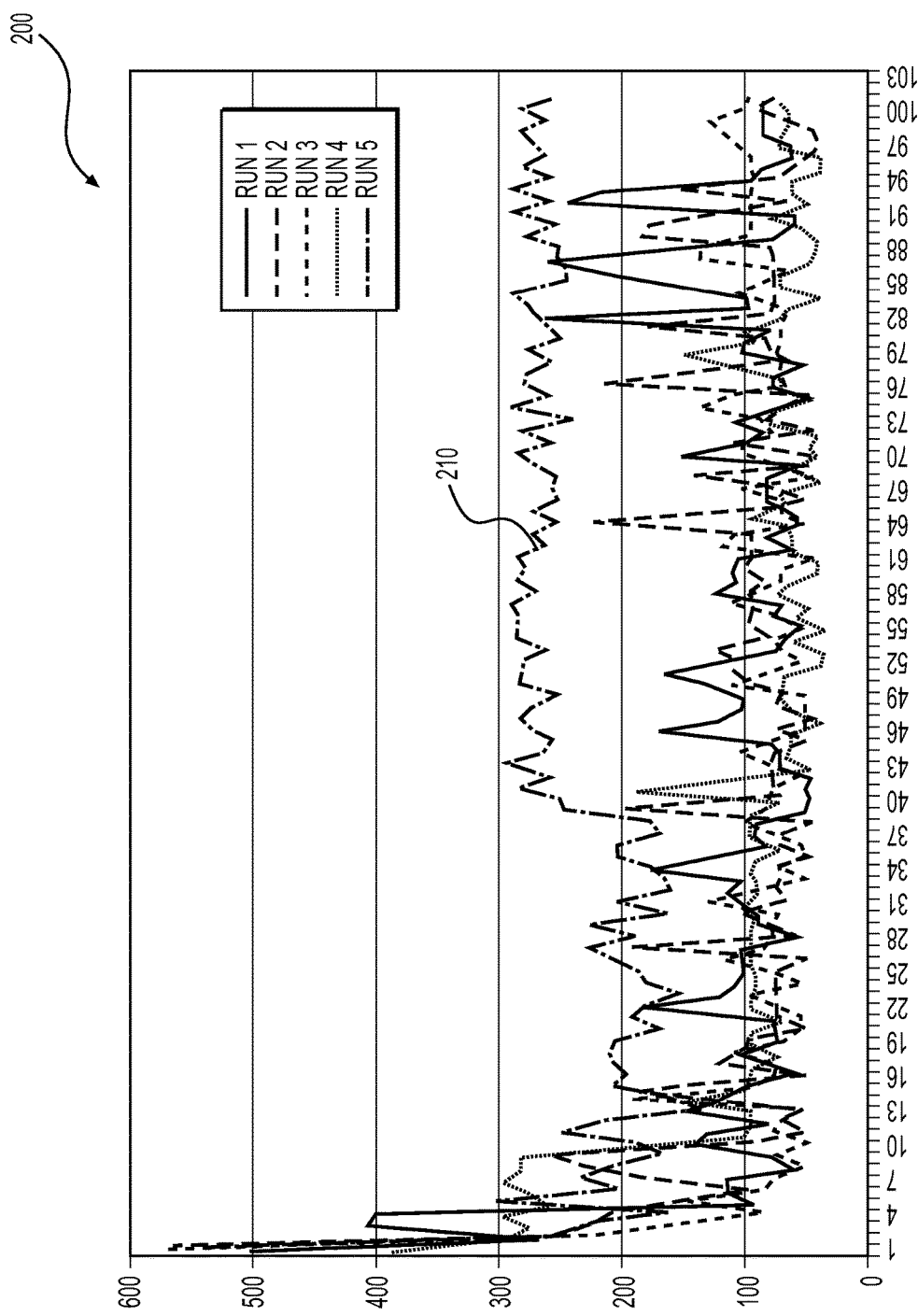
FIGS. 2A and 2B show results of software profiling program code according to an embodiment.
Figure 2B:
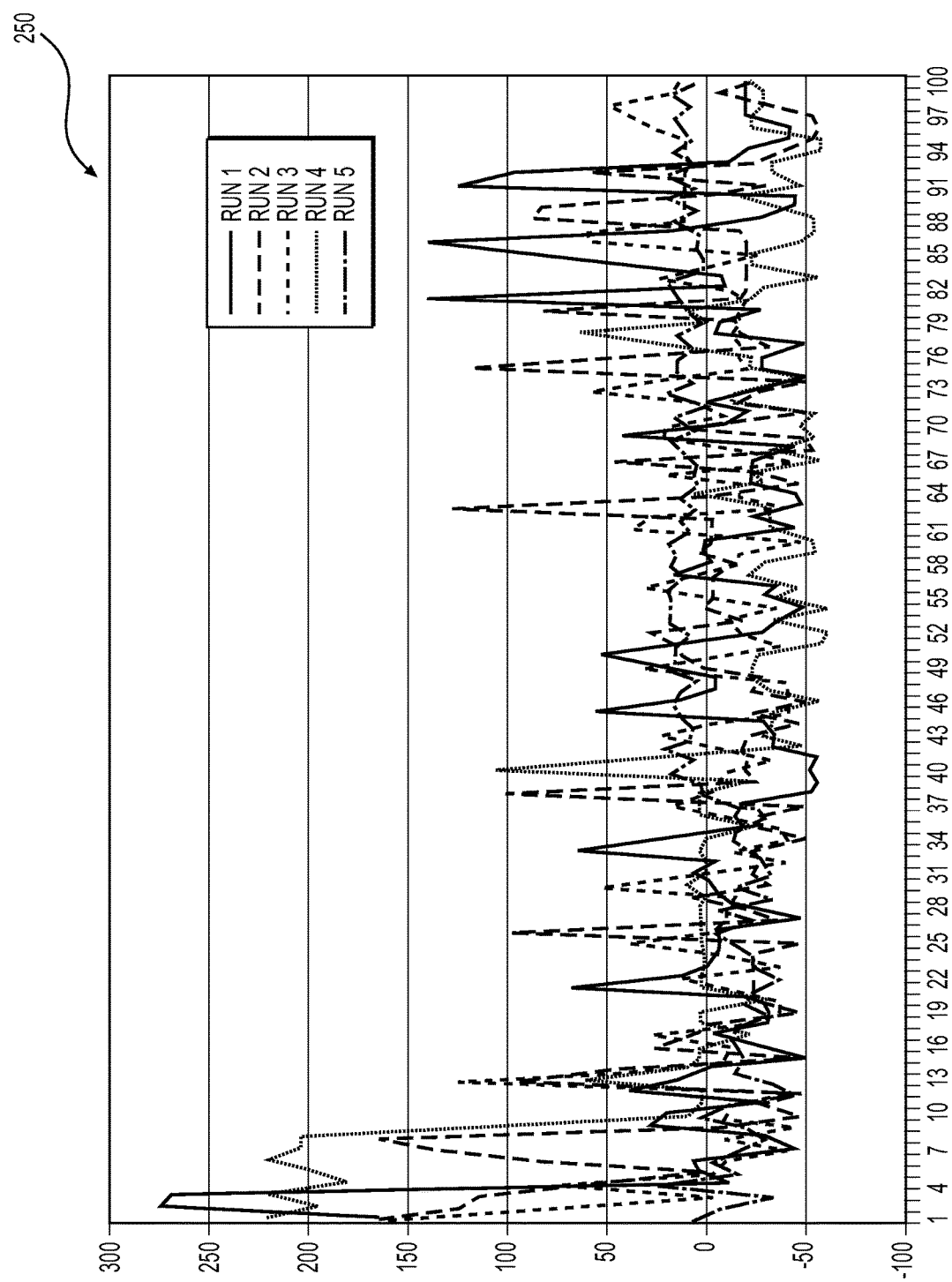

FIGS. 2A and 2B show results of software profiling program code with a TSC according to an embodiment. In particular, FIG. 2A shows a graph set 200 that includes graphs of the TSC data derived from five different runs of the program code and FIG. 2B shows a graph set 250 for the variance of that data.

In each of the five runs shown in graph set 200, the same profiled program code is executed using the same initial data at the start. For each of the five runs, the program code calls a function (such as the function "rtwdemo_sil_topmodel_step( )" in sample program code (1)) 103 times and each of those calls is profiled via a TSC. The values on the abscissa of graph set 200 correspond to the ordinal number of each of those calls. That is, and for example, x=10 corresponds to the tenth time the function was called, and x=100 corresponds to the hundredth time. The values on the ordinate, on the other hand, show the duration of completing each call in cycles, as measured by the TSC.

The five graphs in graph set 200 do not overlap. These graphs thus show that, although the five runs start from the same initial conditions and proceed through the same program code, executing the function call takes different numbers of cycles in different runs. For example, the graphs show that in the fifth run (labelled as graph 210), each function call generally took more cycles than the corresponding function call in runs one to four. For example, in the fifth run, starting from the fortieth function call (x coordinate values between 40 and 103) the duration is above 200 and mostly above 250 cycles. For the first to fourth run, on the other hand, the same function calls (number 40 and above) generally took less than 200 cycles. Thus, software profiling of the program code shows that execution characteristics, such as time duration, for a series of function calls may change from one run to another, even though the runs start from the same initial conditions and proceed through the same program.

FIG. 2B shows variance data derived from the TSC data in FIG. 2A. In particular, each data point for each graph in graph set 250 shows the difference between the corresponding TSC value and the average of TSC values for that run. As graph set 250 show, the durations in each run are not constant and instead fluctuate around the average duration for that run. Therefore, the software profiling further shows that the execution characteristics, such as execution time, for the same function call may change within each run.

While contemporary software profiling may indicate the existence of fluctuations in execution characteristics, it may not identify the source of the fluctuations. For example, while software profiling may show fluctuations in the execution time of a part of program code, such as a function call, software profiling may not identify what causes those fluctuations. Finding the cause, however, may help or be necessary in order to modify the program code to reduce or eliminate the fluctuations or to remove some delays that cause the fluctuations. Moreover, software profiling may only identify overall effects, such as delays in executing a call; and not details of the delay, e.g., which part of the software or hardware causes the delay. Also, software profiling may not identify external factors that may cause the fluctuations, or may not distinguish between such factors.

Some embodiments analyze the changes in program code's execution behavior by employing a different type of profiling, called hardware profiling. In some embodiments, hardware profiling may include directly sampling hardware counters of the one or more processors that execute an underlying software such as an operating system. For example, some embodiments collect HD metrics to find factors that may affect execution characteristics. An HD metric is a quantity that measures some activity of a hardware component, such as a memory or a processor. Such a metric may, for example, measure how the hardware component is utilized during the execution of the program code. A HD metric may include, for example, a number of instructions retired by a processor or a number accesses that were missed in memory.

Some embodiments determine one or more HD metrics during execution of program code. The metrics may result from data collected by one or more hardware performance counters, such as special purpose registers that are included in a processor. Such counters may store information about hardware related activities of a computing device. In various embodiments, HD metrics may include one or more of the following: number of instructions retired, number of cache misses or cache hits, number of branch mispredictions, total number of cycles per step, and so on.

Number of instructions retired may be a value for representing a number of instructions that are successfully retired by the processor pipeline. Number of cache misses (hits) may be a value for representing a number of times that the processor did not find (did find) in the cache a memory location that is referenced in the instruction. Number of branch mispredictions may be a value for representing a number of times that the processor chose an incorrect outcome of a branch. As a result instructions that were fetched and speculatively executed were not retired. Such instructions, for example, contribute to the number of instructions executed but do not contribute to the number of instructions retired. Number of cycles per step may be a value for representing an average number of processor cycles used to execute each step during the execution.

Figure 3:
FIG. 3 shows a table that lists a number of hardware performance counters included in different processors according to some embodiments.

In different embodiments, processors may provide different numbers of hardware performance counters that can be sampled simultaneously. In some embodiments, the number of performance counter does not limit the number of event types that can be sampled. FIG. 3 shows a table 300 that lists a number of hardware performance counters included in different processors according to some embodiments. The first row in table 300, for example, indicates that the Ultra Sparc II processor includes two hardware performance counters that can be used to collect data and determine HD metrics. The last row of table 300, on the other hand, indicates that the Pentium 4 processor includes eighteen counters that can be used. The numbers in table 300 are for illustration only. In some embodiments, one or more of the listed processors may provide a smaller or a larger number of hardware performance counters.

Some embodiments provide an interface for collecting the data delivered by the performance counters. One such interface includes a component based Performance Application Programming Interface (PAPI). PAPI provides an interface for collecting counters from different hardware devices. PAPI may be supported by a variety of hardware platforms such as Cray T3E, X1, Sun UltraSparc/Solaris, Alpha/Tru64, IBM Power 604$e$, 2, 3, 4/AIX, 5, 6, 7, MIPS R10k/IRIX, IA64, IA32, x86_64/Linux, and Windows/IA32.

FIG. 4 shows a list 400 of PAPI pre set events as used in some embodiments. List 400 is grouped into different types of events, which include conditional branching, cache requests, conditional store, floating point operations, data access, TLB operations, instruction counting, and cache access. The group for instruction counting, for example, includes a block 402 of three events, that are, PAPI_TOT_CYC, for counting total cycles; PAPI_TOT_IIS, for counting issued instructions; and PAPI_TOT_INS, for counting total instructions completed. Different embodiments may use one or more of the events in list 400 for hardware profiling. A hardware profiling tool, such as PAPI, may be used to collect data related to execution of program code or a section of the program code.

Figure 5:
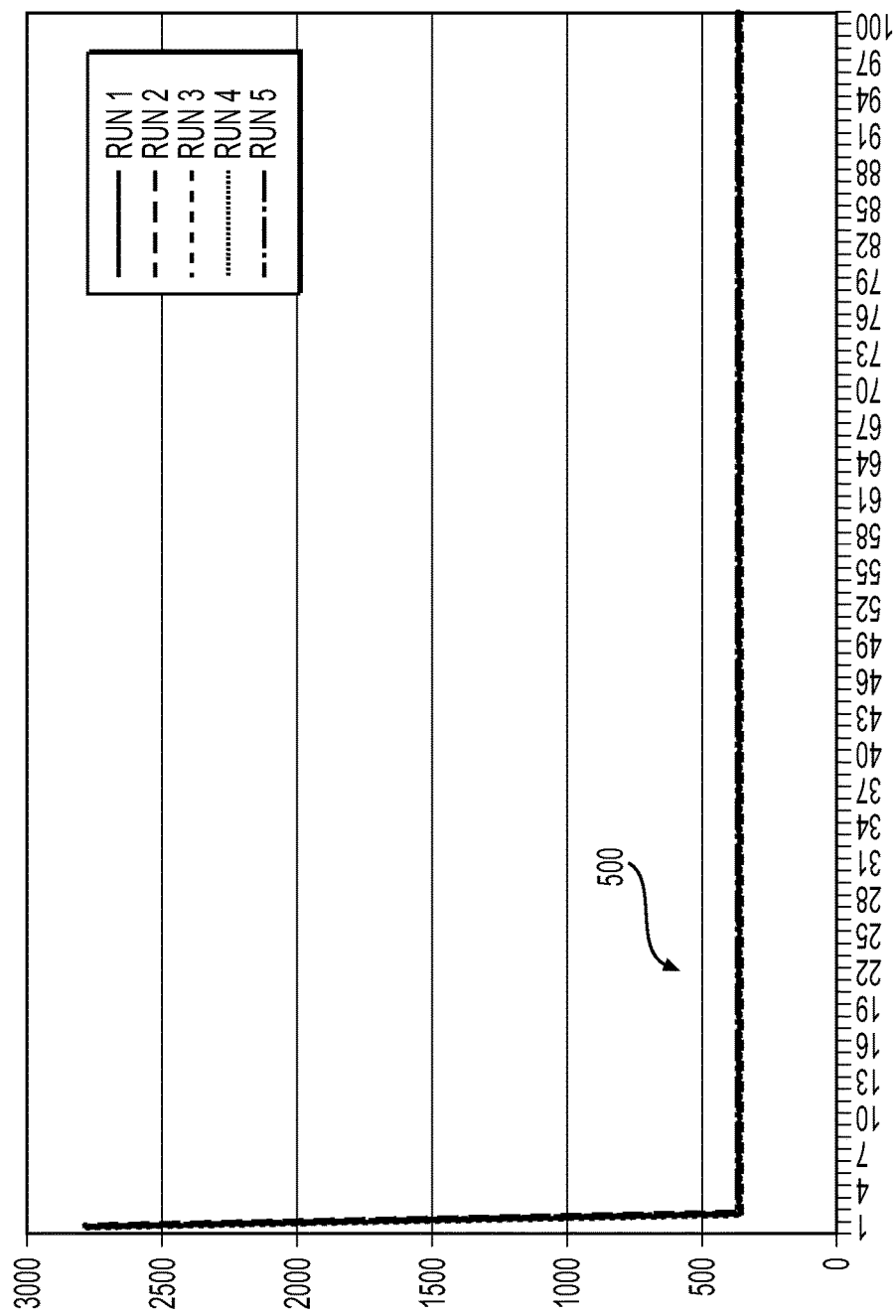
FIGS. 5 and 6 show results of hardware profiling program code with PAPI interfaces according to an embodiment.

Hardware profiling program code may provide information that is different or more detailed than information derived from contemporary software profiling. FIG. 5 shows results of hardware profiling program code with a PAPI interface according to an embodiment. In particular, FIG. 5 shows a graph set 500 for total retired instructions, as derived from the five different runs that were discussed in FIGS. 2A and 2B. The abscissa of graph set 500 is similar to those of graph sets 200 and 250. The ordinate, on the other hand, corresponds to the total number of retired instructions at each function call. These numbers may be collected via, for example, the preset event PAPI_TOT_INS listed in FIG. 4.

FIG. 5 shows that the total number of retired instructions does not change from one run to another. In particular, the five graphs for the five runs overlap. The data for all runs start from a large number (around 2750) for the first call, drop to around 300 for the second call and remain at that number for all runs up to the end (the $103^{rd}$ run). Comparing FIG. 5 with FIGS. 2A and 2B, may thus indicate that the number of retired instructions does not change in different urns. Therefore, in some embodiments, the variations in the execution times, as represented in FIGS. 2A and 2B, may not result from the structure of program code. In such embodiments, collecting metrics such as those shown in FIG. 2A or 2B may not reflect the performance of program code and may not be helpful in identifying parts of program code that can be improved.

Some embodiments employ one or more types of hardware level optimizations in executing program code. Hardware level optimizations may include, for example, using different types of pipelines, branch condition predictions, or cache management policies. These optimizations usually result in speeding up the execution of program code. Cache management policies, for example, often enable program instructions to access data more quickly. Using pipelines enables simultaneous execution of different stages of different instructions. And branch prediction often enables a more efficient use of the pipeline by foreseeing and sending a later instruction into the pipeline.

Figure 6:
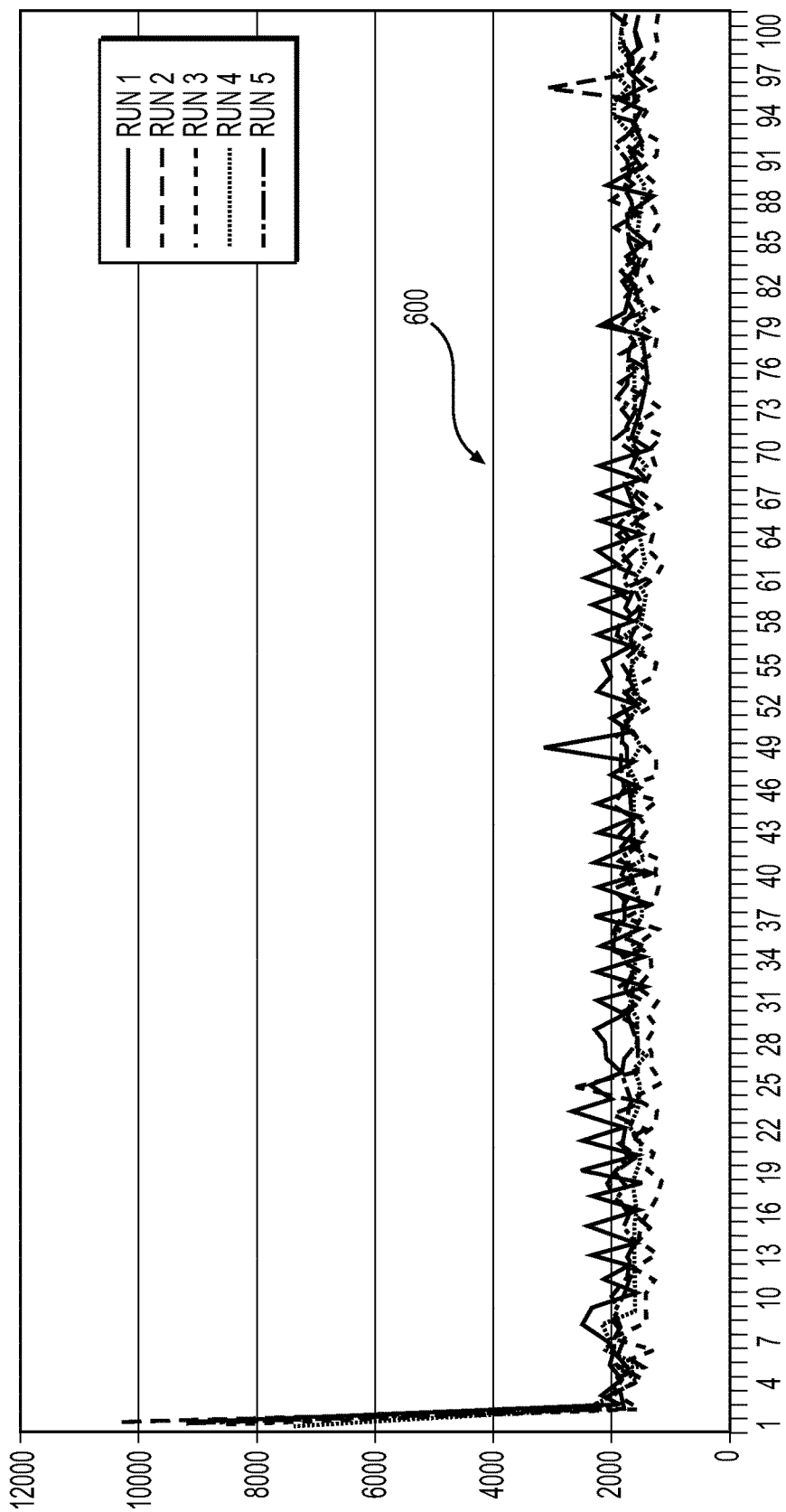

In some cases, however, hardware optimizations may cause execution anomalies. Execution anomalies include cases in which an optimization results in an overall slowdown of the execution. An execution anomaly may be detected using HD metrics. For example, an execution anomaly may cause an HD metric to change from one run to another. FIG. 6 shows graphs of data for one such metric derived from hardware profiling program code according to an embodiment. In particular, FIG. 6 shows a graph set 600 for total cycles, as derived from the five different runs that were discussed in FIGS. 2A, 2B, and 5. The abscissa of graph set 600 is similar to those of graph sets 200, 250, and 500 in those figures. The ordinate, on the other hand, corresponds to the total number of cycles at each function call. In some embodiments, each instruction takes a number of cycles depending on the number of stages in an instruction pipeline. This number may, for example, depend on the type of the processor. The speed of the processor, on the other hand, may determine the duration of each cycle. The total number of cycles may be collected via, for example, the preset event PAPI_TOT_CYC listed in FIG. 4.

FIG. 6 shows that, unlike the total number of retired instructions graphed in FIG. 5, the total number of cycles changes from one run to another. In particular, the five graphs for the five runs do not overlap for all calls, and instead differ by as much as around 1000 cycles for some calls. These variations among different runs may occur because the number of cycles may be affected by occurrences such as branch mispredictions. While a branch misprediction does not add to the number of instructions retired (graphed in FIG. 5), it may add to the number of executed instructions and thus the total number of cycles (graphed in FIG. 6). A branch misprediction may occur because of internal or external factors, as further illustrated below, for example, in relation to FIG. 7.

To identify factors that affect execution variations, some embodiments collect and analyze HD metrics. Such metrics may better show how different parts of program code consume resources such as execution cycles. Some resources, such as execution cycles, can be mapped to observable execution factors such as execution time.

Figure 7:
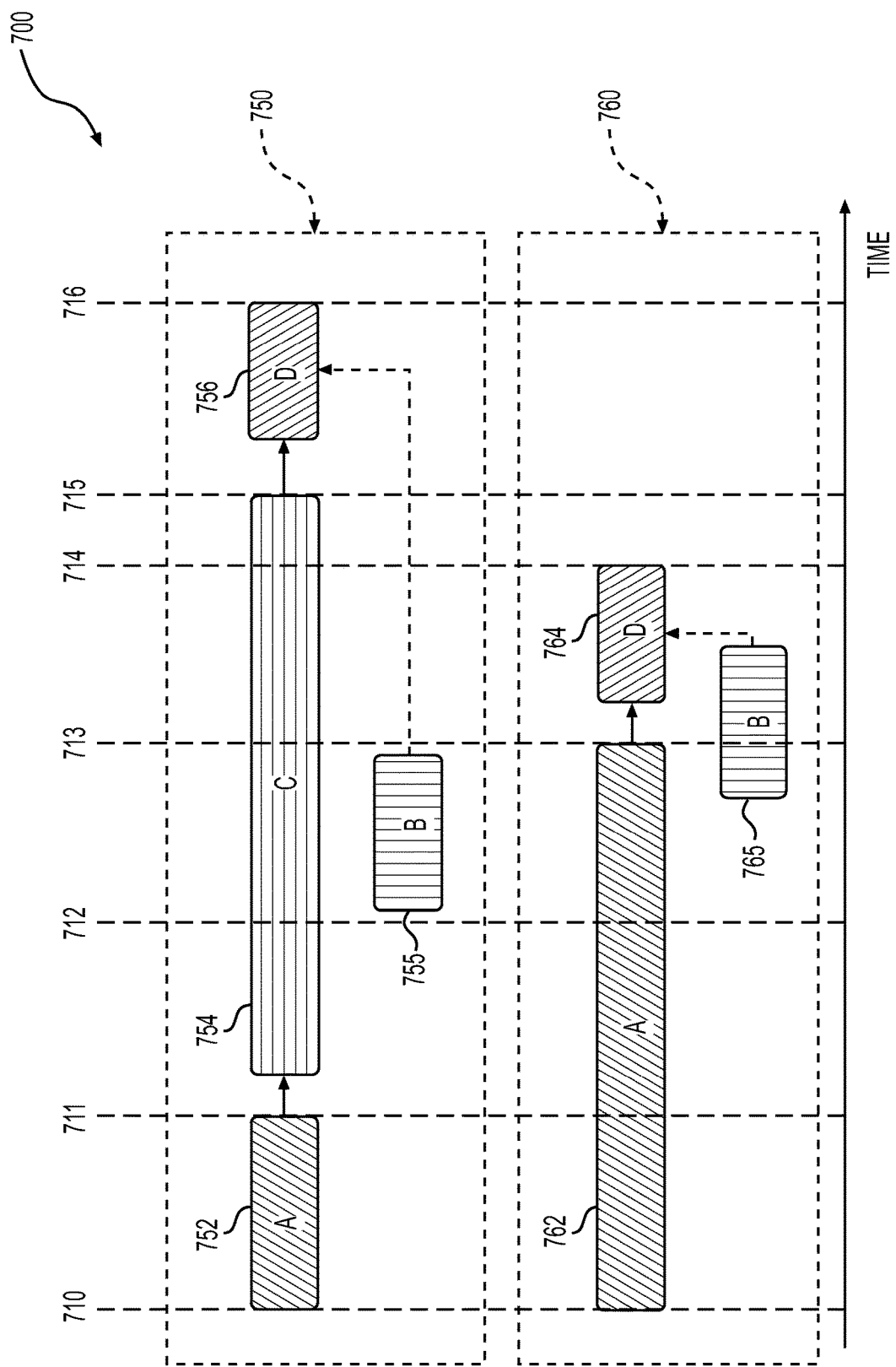
FIG. 7 depicts block diagrams for two different scenarios of executing program code according to an embodiment.

Some embodiments address execution anomalies by analyzing the HW related sources of execution fluctuations. HW level analyses may include, for example, collecting HD metrics for accessing hardware memory or for branch mispredictions. An example of such an execution fluctuation is described in relation with FIG. 7. FIG. 7 depicts a block diagram 700 for two different scenarios (shown as block sets 750 and 760) of executing program code according to an embodiment. The two scenarios may correspond to two executions of the same program code at two different times. As explained below, the two scenarios are affected by cache hits or misses, or by branch mispredictions. The cache hits or misses, or branch mispredictions, may change from one run to another, causing fluctuations in execution time. The cache hits or misses may change, for example, because the processor may simultaneously execute multiple program codes.

In FIG. 7, the horizontal direction corresponds to the passage of time, as indicated by the horizontal time axis. Moreover, different instructions of the program are shown as blocks A, B, C, and D. The length of each block in the horizontal direction represents the relative length of time spent in executing the corresponding instruction. Vertical broken lines 710-716 represent seven time spots during the execution of the program code.

In each of the two scenarios 750 and 760, the program causes the processor to execute some or all of the instructions A-D based on the rules explained below. Moreover, the processor may use a multi-stage pipeline architecture for executing the instructions. The processor first executes instruction A by sending it into the pipeline. Instruction A requires reading some input data from cache memory. The length of executing instruction A depends on whether the input data is present in the cache (cache hit) or not (cache miss). Instruction B is a branch instruction that includes evaluating a branch condition. The branch condition depends on data that reach the evaluation stage at time spot 712. Therefore, the branch condition in B cannot be evaluated before time spot 712 and is instead evaluated at or after time spot 712. If the condition is not satisfied, the processor executes instruction C followed by instruction D. If the condition is satisfied, the processor does not execute instruction C and only executes instruction D.

In some embodiments, execution of the program may include a branch condition prediction. In particular, if instruction A completes before instruction B is executed, the processor may attempt to predict the outcome of the condition in instruction B and, if necessary, start sending instruction C into the pipeline before the condition is evaluated. The cache hit or miss, or an error in the prediction, i.e., a branch misprediction, may result in unexpected outcomes such as those illustrated in block sets 750 and 760.

Block set 750 represents a first scenario in which instruction A encounters a cache hit. The processor starts by executing instruction A at time spot 710 (block 752). In this scenario, the input data for instruction A is present in the cache and is read from the cache. This situation is called a cache hit for instruction A. Execution of instruction A in block 752 completes at time spot 711. At this time, the processor utilizes branch condition prediction and predicts that the branch condition in B would not be satisfied. The processor thus predicts that instruction C would have to be executed. The processor starts executing instructions C by sending it into the pipeline at timespot 711 (block 754).

Continuing the first scenario of diagram 750, all data necessary for evaluating the branch condition in B reaches the evaluation stage at time spot 712. The processor evaluates the branch condition at time spot 712 (block 755) and while block 754 is in progress. Contrary to the prediction, however, the branch condition is satisfied and thus the processor need not retire instruction C. Such error in predicting the branch condition is a branch misprediction.

Because of the misprediction, the process starts squashing the execution of instruction C after time spot 712. The squashing may include rolling back some effects of executing C, such as resetting some hardware registers. It takes until time spot 715 for the squashing to complete. At time spot 715, the processor starts execution of instruction D (block 756). The processor completes the execution of instruction D at time spot 716.

The program code behaves differently in the second scenario shown in block set 760 due to a cache miss. As in the previous scenario, the processor starts by executing instruction A at time spot 710 (block 762). In this scenario, however, the input data for instruction A is not present in the cache and is thus fetched from a non-cache memory. This situation is called a cache miss for instruction A. Because of the cache miss, the execution of instruction A in block 762 takes longer than block 752 of the first scenario and completes at time spot 713. Before reaching time spot 713, however, all data necessary for evaluating the branch condition in B have reached the evaluation stage at time spot 712. The processor can thus evaluate the branch condition of instruction B at time spot 713 (block 765). Therefore, in this scenario, the processor need not predict the branch condition. Instead, because as in the first scenario the branch condition is satisfied, the processor does not execute instruction C and after time spot 713 proceeds to execution of instruction D (block 764). This execution completes at time spot 714, which is earlier than the completion time in the first scenario, that is, time spot 716.

The above scenarios illustrate an execution anomaly in which a HW optimization that is designed to speed up the execution in some cases, causes a slowdown in some other cases. For example, if in scenario 750 the branch prediction were correct, i.e., if the branch condition were not satisfied at time spot 712, then the branch prediction had sped up the execution by starting instruction C at time spot 711 instead of time spot 712. When, on the other hand, the branch prediction is incorrect, as in scenarios 750 and 760, not applying a branch prediction may speed up the execution, by avoiding the consequences of the branch misprediction in scenario 750.

As seen above, a cache hit or miss, or branch misprediction, can change the execution time of program code. In particular, the combination of a cache hit and a branch prediction in the first scenario caused an overall delay. In such cases, preventing the HW optimization, such as branch prediction, may speed up the overall execution of program code (e.g., earlier completion in the second scenario). Therefore, predicting or analyzing an execution behavior may require more than understanding behaviors of different program sections considered individually. Improved program execution speed or resource usage may be achieved by considering relationships among different program sections (e.g., the relationship between instruction A and B in FIG. 7), and some underlying HW optimizations.

Cache events such as cache hits or cache misses, or branch condition mispredictions, may depend on internal factors or external factors. In the scenarios of FIG. 7, for example, the input data for instruction A may be present in the cache because it has been cached by the same or a different program code that is executed by the same processor. Such a situation may result in a cache hit discussed in the first scenario shown in block set 750. Alternatively, data for instruction A may be removed from the cache if the same or another program code uses the cache for fetching a different set of data. For example, if other tasks or programs are executed by the processor, data needed by instruction A is more likely to be removed from the cache. Such a situation may result in a cache miss discussed in the second scenario shown in block set 760. Thus, fluctuations may results from cache hits or cache misses that depend on how many programs the processor executes simultaneously. This, in turn, may depend on external factors, such as the use of the processor by a user for other tasks.

Some embodiments collect HD metrics to identify hardware related execution anomalies, such as the above cache events or branch mispredictions. An execution anomaly may include an unexpected behavior of the code. For example, in an execution anomaly, a change in behavior of a section of the code (i.e., a delay) may cause an overall change in the opposite direction (reduction in overall time). FIG. 7 shows an example of an execution anomaly, in which increasing an execution time of a section of the code by introducing a cache miss (cache miss of instruction A in block 762 of block set 760) results in an overall decrease in the execution time of the code. In this example, the anomaly resulted from a branch condition misprediction. In some embodiments, such an anomaly is called a branch misprediction anomaly. As seen above, to analyze such an anomaly, it may not suffice to collect and analyze one type of metric, such as cache related cache misses and cache hits. Instead, the analysis may require collecting and analyzing a larger number of metrics or metrics of different types, such cache misses and branch condition mispredictions.

Once execution anomalies are identified, the program code may be modified to address the anomaly. Modifying the program code may help improve the program code by, for example, avoiding fluctuations or decreasing the execution time of the program code.

Figure 8:
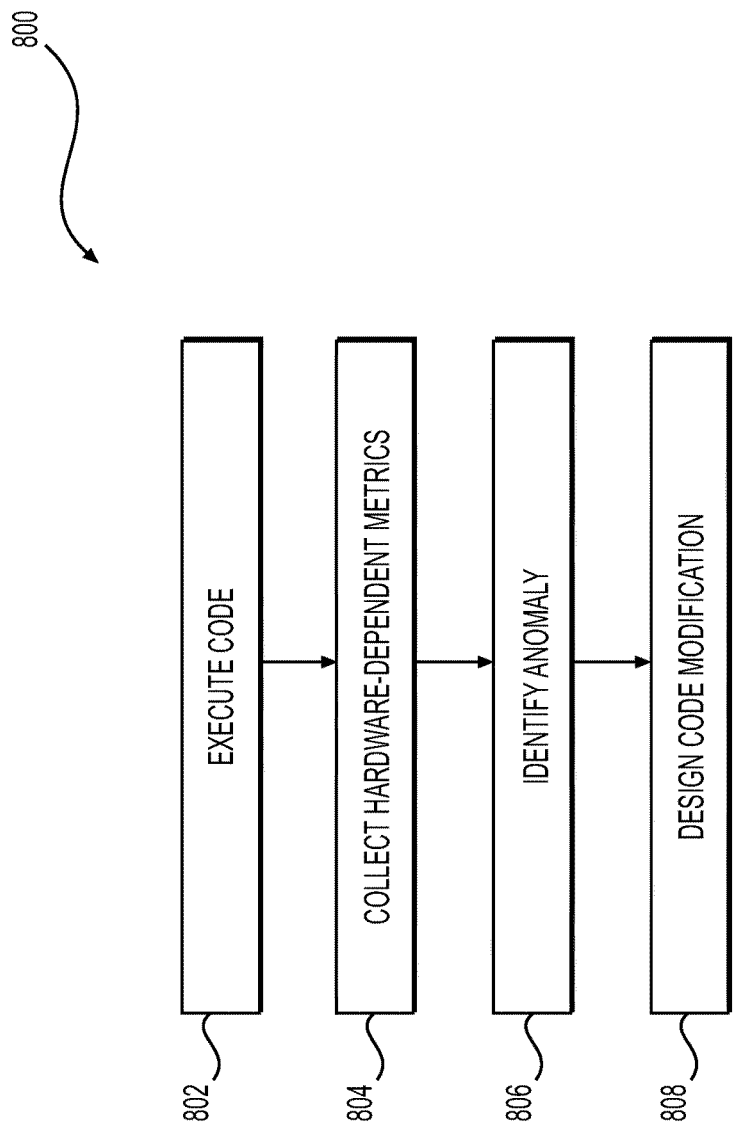
FIG. 8 shows a flowchart of a method for identifying execution anomalies of program code and utilizing that information according to some embodiments.

FIG. 8 shows a flowchart of a method 800 for identifying execution anomalies of program code and utilizing that identification according to some embodiments. In step 802, the program code is executed via one or more processors. In step 804, during the execution, one or more HD metrics are collected. These HD metrics may include one or more of number of instructions retired, number of cache misses or cache hits, number of branch mispredictions, total number of cycles per step, and so on. In some embodiments, an interface such as PAPI is used to collect the one or more HD metrics.

In step 806, an execution anomaly may be identified. An execution anomaly may correspond to a larger than average number for one or more HD metrics. For example, such an anomaly may be identified when a larger than average number of cache misses or branching mispredictions are found. The averages may be derived among different blocks of code during the same execution run or among different execution runs for the same block of program code or program code as a whole, e.g., executing multiple blocks of code making up a program.

Figure 9:
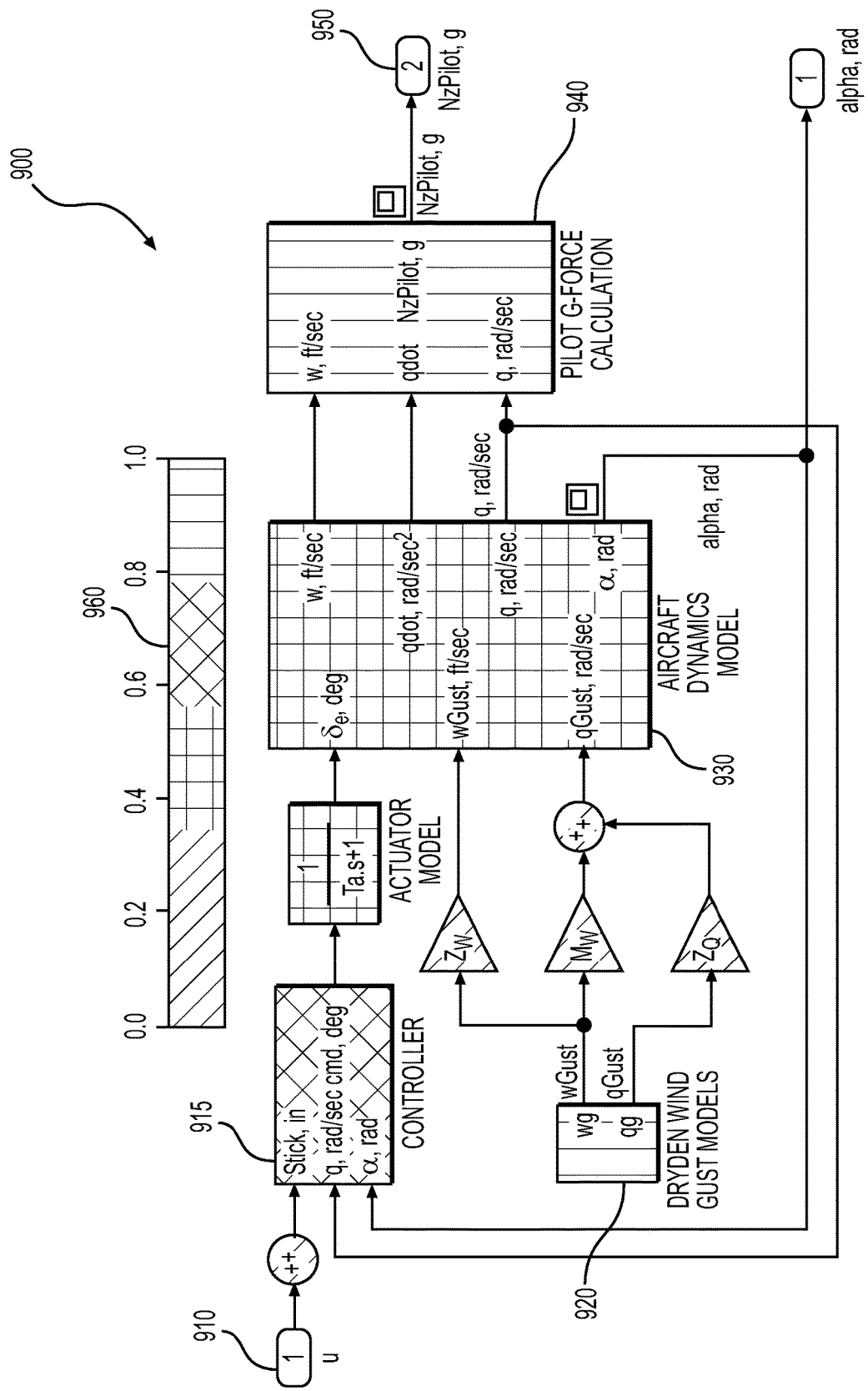
FIG. 9 shows a block diagram for a model of program code according to an embodiment.

An example of identifying performance issues and execution anomalies is depicted in FIG. 9. FIG. 9 shows a block diagram for a model 900 according to an embodiment. Model 900 may comprise blocks made up of program code. Model 900 calculates the G-force that is exerted on the pilot of an aircraft. Model 900 includes a stick position input terminal 910, a controller module 915, a wind gust module 920, an aircraft dynamics model module 930, a pilot G-force calculation module 940, a G-force output terminal 950, and a cache miss reference 960.

Stick position input terminal 910 is used to enter the position of the airplane control stick. Wind gust module 920 provides data related to a simulated wind gust. The model sends outputs of input terminal 910 and wind gust module 920, after some operations, to aircraft dynamic model module 930. Module 930 provides inputs to G-force calculation module 940. G-force calculation module 940 calculates the G-force exerted on the pilot and outputs a G-force value through G-force output terminal 950.

FIG. 9 shows an example of identifying performance issues that may result in execution anomalies. In the example shown in FIG. 9, a processor executes model 900 and collects one or more HD metrics. In particular, the processor collects information identifying a number of cache misses by one or more of the modules in model 900. The relative cache miss by each module is shown using, e.g., a pattern map 960. The relative cache miss can range from low, i.e., between 0 and 0.35 (shown by a diagonal hatch pattern) to high, i.e., between 0.8 and 1.0 (shown by a vertical lines pattern). Cache miss reference 960 can use other techniques for indicating quantities of cache misses, such as other types of patterns color or grey scale codes, numerical values, symbols, etc. FIG. 9, therefore, shows that a relatively high number of cache misses occur when the processor executes modules 920 and 940. Modules 915, or 930, on the other hand, show a relatively low number of cache misses. Thus, a performance issue of high cache misses exists in modules 920 and 940. To identify an execution anomaly, other HD metrics may be collected to determine whether more than one performance issue exists and whether those performance issues affect each other. One or more HD metrics may, for example, identify existence of branch mispredictions in model 900. One or more of the performance issues may be removed by modifying the software through, e.g., reordering some of the modules; or by modifying the hardware through, for example, increasing cache size or changing size of pipeline. Some of these modifications may reduce one type of performance issue but deteriorate the overall performance model 900 by creating or increasing another type of performance issue. This execution anomaly may be addressed by identifying a performance issue that, if removed, improves the overall performance of the program.

Returning to FIG. 8, in step 808 and based on the collected metrics, modifications of the program code may be identified. The program code modifications may address the execution anomalies. For example, if the execution anomaly includes a large number of cache misses, the program code modification may include implementing some data reuse among different modules, or re-organizing different parts of the program code to reduce clashes between cache lines, which may cause cache misses. In various embodiments, addressing the anomaly may help to optimize the program code by improving its performance or causing the program code to behave consistently at different times or under different situations, and so on. In some embodiments, the performance may be improved through code generation technologies. Such technologies, however, may use a static model that does not take into account dynamic factors, that is, how the code behaves during execution. These dynamic factors may depend on execution time information or architecture related information such as size of the pipeline, which may affect branch misprediction. These factors can be determined via the dynamic method discussed here.

For the program code discussed in FIG. 7, for example, the fluctuation in execution time may be addressed by, among other things, preventing the prediction of the branch condition, advancing the evaluation of branch condition from time spot 712 to a time spot that is at or before time spot 711, or delaying evaluating the branch condition to a time spot after time spot 712, at which point instruction B is executed. The branch evaluations may be delayed, for example, by introducing some NOP (No Operation) instructions before the branch prediction.

Similarly, in the example of FIG. 9, the program code may be modified to reduce the cache misses in modules 920 and 940. Analyzing model 900 may indicate that, for example, module 940 encounters a large number of cache misses because module 930, which executes before module 940, evicts most of the memory used by module 940. In such a case, the program code may be redesigned such that module 930 does not evict the data used by module 940. For example, this may be done by moving some or all of module 930 so that some or all of module 930 operates after module 940 and does not evict the memory. Alternatively, the program code may be redesigned such that module 940 reuses some of the data structures used by module 930. As an example, some of the data that are read by module 940 may be written to memory locations that are used by module 930. As a result, when module 940 later tries to read those data, it may not encounter a cache miss.

Modifying a program code by reordering a section of program code may include reordering access to data structures in a memory. Reading elements of a matrix along its rows, for example, may be changed to reading them along the columns. Such reordering may affect number of cache misses by, for example, reducing them.

Modifying program code may also include replacing branches with conditions executions. Such reduction may reduce the number of branch mispredictions that may result in branch related anomalies.

HD metrics may depend on the architecture of the hardware on which the program code is executed, and thus change from one hardware device to another. The architecture of a hardware device may include, for example, the number or type of processors, cores, memories, bus types, and so on. As shown above, collecting and analyzing HD metrics may help in analyzing and improving the behavior of program code on the hardware device where the HD metrics was collected or on hardware devices that have similar architectures.

Some embodiments collect HI metrics, which do not depend on the architecture of the hardware, and instead depend on the structure of program code itself. Such HI metrics may be used to predict the behavior of program code execution on different hardware architectures, for example, a hardware architecture on which the program code has not yet been executed. Such prediction may help in choosing a hardware architecture that will meet the expected or desired execution characteristics, such as execution time.

Figure 10:
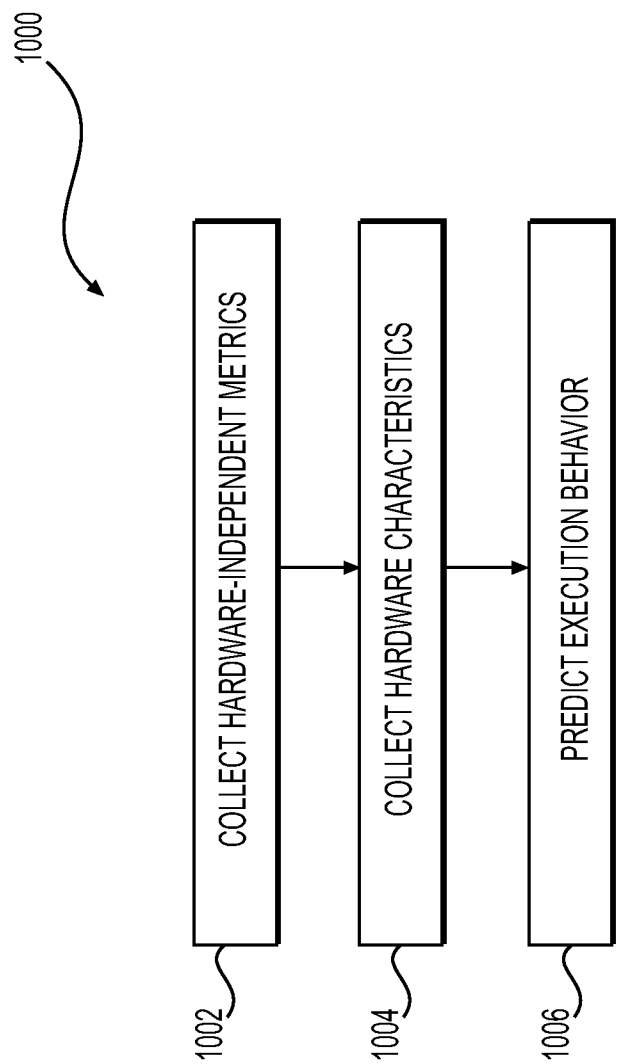
FIG. 10 shows a flowchart of a method for collecting and utilizing hardware independent metrics according to some embodiments.

By way of example, for program code that is executed by an automobile system, a safety standard may require a maximum allowed time for the reaction time by the car when the driver steers or brakes. To meet the standard, the one or more processors may need to satisfy a minimum processing speed or memory capacity. In some embodiments, collecting and analyzing HI metrics may help in establishing a minimum requirement. When appropriate, the minimum requirement can be applied when designing the car. Further, HI metrics may help in predicting whether two different program codes behave in a similar manner when executed on a piece of target hardware. Such prediction may not require running either of the program codes on the target hardware FIG. 10 shows a flowchart of a method 1000 for collecting and utilizing HI metrics according to some embodiments. In step 1002, one or more HI metrics are collected. In various embodiments, HI metrics may include, for example, one or more of instruction mix, instruction-level parallelism, register traffic, working-set size, data stream strides, branch predictability, and so on.

HI metrics may be determined in different ways. In various embodiments, an HI metric may be determined dynamically or statically. Static derivation may include analyzing the program code in its high level, compiled, or binary version. Dynamic derivation, on the other hand, may include executing the program code on one or more processors, collecting data using one or more performance counters, and deriving from the data a desired HI metric. Although the data are collected through the one or more processors, the resulting HI metric may not depend on the hardware architecture of the processors.

Dynamically determined HI metrics may, however, depend on the specifics of the execution. In particular, they may depend on the execution path that the program code takes during the one or more executions to collect the data. The path itself may depend on the input data. HI metrics that are collected in this way, may be more helpful for executions that take the same or similar execution paths. To use the HI metrics for a different execution path, the metrics may need to be re-determined by re-executing the program code using, for example, different input data. In various embodiments, the input data may be chosen based on different criteria. For example, it may be desirable to profile for full coverage (e.g., condition coverage, decision coverage, statement coverage, etc.). Thus, some embodiments may use a suite of input data to satisfy certain coverage objectives. The HD or HI metrics could be gathered based on this suite of input data cases.

Statically determined HI metrics, on the other hand, may not depend on the execution path of the program code, because these metrics are not collected by executing the program code. Instead, these metrics may be determined by analyzing the structure of the program code and considering a variety of hypothetical execution paths that the program code may take. An actual execution of the program code may take some of those hypothetical paths in rare situations, which do not happen during usual executions. Considering these paths may cause the statically determined HI metrics to result in different predictions compared to the dynamically determined HI metrics.

An HI metric called instruction mix may measure a ratio of the number of a type of instruction to the total number of instructions. Different types of instructions may include, but are not limited to, load, store, branching, floating point operation, arithmetic operations, multiplies, etc. To determine these HI metrics, data may be collected from hardware performance counters for the corresponding instructions and for the total instructions.

An HI metric called instruction level parallelism may be determined from a static analysis of program code. Program code may be, for example, a source code or a binary code. In some embodiments, although a binary code is generated based on a specific hardware architecture, it may reveal some program properties that do not depend on that architecture. These properties may include dependencies between different instructions in the binary. These dependencies may identify instructions that are not dependent on each other and may be executed in parallel. From these identification an instruction level parallelism metric can be derived as, for example, a number of different groups of instructions that are independent and can thus be executed in parallel.

An HI metric called floating point ratio may be determined from a static analysis of program code. Floating point ratio may be determined as the ratio of floating point instructions to the total number of instructions. This metrics may help determine a change in performance of program code if the number of floating point units in hardware changes.

An HI metric called register traffic may be determined dynamically. This metric counts the number of registers that are accessed by each instruction. In particular, this metric may measure one or more of an average number of registers per instruction, per read/write operation, or an average number of instructions between register production and consumption.

An HI metric called working set size may measure a number of unique blocks or memory pages interacted with by both instruction and data streams. This metric may be determined dynamically from the number of cache misses and evictions. The data from the corresponding performance counters may be used to estimate the total amount of memory accessed by instructions or data streams.

An HI metric called data stream strides may measure distribution of global and local strides. In some embodiments, a function is defined as a group of instructions. The instructions may be, for example, assembly instruction or statements from a high-level language such as C++. In some embodiments that use assembly code, for example, a local stride is a number of instructions within a region that is denoted by to be a function. A global stride, on the other hand, includes the instructions that are not local and, for example, are located between two local regions. The data stream strides metric may be determined dynamically from the number of instruction that are executed between instructions that access memory.

In some embodiments, local and global strides may be defined in terms of basic blocks. In some embodiments, a basic lock is defined as a collection of instructions that has one entry point and one exit point. A local stride may be a number of instructions in a basic block between two instructions that access memory and are in that basic block. A global stride, on the other hand, may be a number of instructions between two instructions that access memory and are in two different basic blocks.

In some embodiments, local and global strides may be defined in terms of functions that include basic blocks. A function may be defined as a collection of basic blocks. Moreover, in these embodiments, a function based local stride may be defined as a number of instructions between two instructions that access memory and are in basic blocks belonging the same function. A function based global stride, on the other hand, may be defined as a number of instructions between two instruction that access memory and are in basic blocks that do not belong to the same function.

An HI metric called branch predictability may measure an accuracy of branch prediction for a theoretical predictor. This metric may be determined dynamically from comparing execution of branch predictions and branches. Alternatively, this metric may be determined statically by analyzing the binary code based on a branch prediction model.

Returning to FIG. 10, in step 1004, one or more hardware characteristics are collected. These hardware characteristics may correspond to the hardware that is going to execute the program code.

Figure 11:
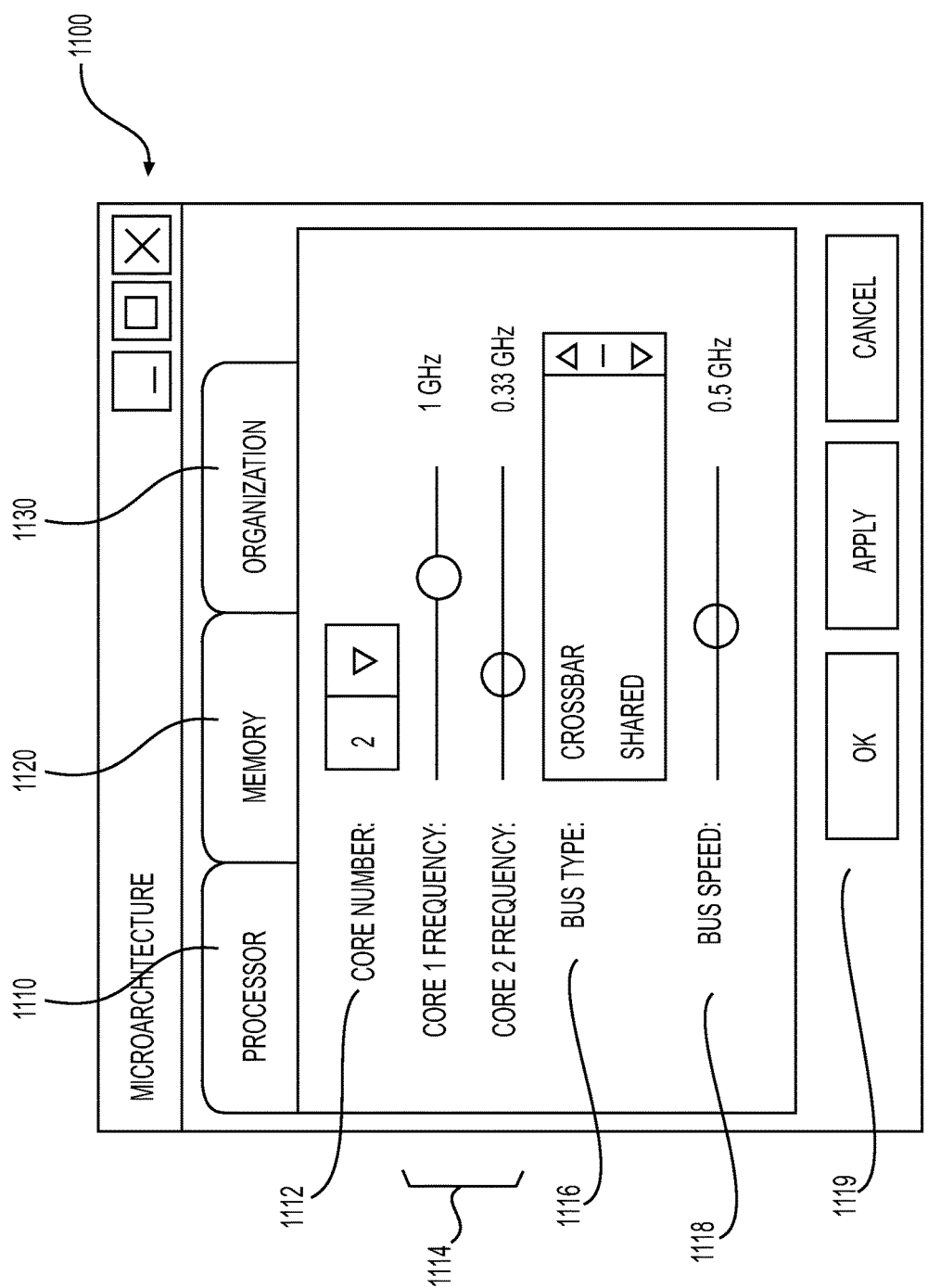
FIG. 11 shows an interface for collecting hardware characteristics according to an embodiment.

In some embodiments, a hardware identification interface is used to collect the hardware characteristics. FIG. 11 shows an interface 1100 for collecting hardware characteristics according to an embodiment. Interface 1100 may be presented to a user via an input/output interface, such as display, keyboard, and mouse. Interface 1100 includes three tabs, a processor tab 1110, a memory tab 1120, and an organization tab 1130. Processor tab 1110 is configured to collect information related to one or more processors of the hardware. Memory tab 1120 is configured to collect information related to the memory used by the hardware. Organization tab 1130 is configured to collect information related to the organization of different parts of the hardware.

FIG. 11 further shows some details of processor tab 1110. In particular, tab 1110 includes a core number section 1112 for receiving a number of cores in the one or more processors, a core frequency section 1114 for receiving the frequencies of the one or more cores, a bus type section 1116 for receiving a type of the bus used by a processor, a bus speed section 1118 for receiving a speed of the bus, and a button section 1119, which includes different buttons for accepting, applying, or cancelling the entered data.

Memory tab 1120 may be configured to receive memory related information such as a number of cache hierarchies used by the hardware, a size of cache in each level, a cache eviction policy, or a cache coherence protocol used by the cache. Organization tab 1130 may be configured to receive information related to the type or number of connections between processors and caches or other peripherals in the hardware architecture.

Returning to FIG. 10, in step 1006, the execution behavior of the hardware is predicted. In some embodiments, this prediction is based on the HI metrics and the collected hardware characteristics.

The following example illustrates the use of HI metrics in predicting the execution behavior of hardware. In this example, a dynamic metric derivation has provided two types of HI metrics for the program code. The first type is for the instruction mix. The total number of instructions is determined to be around $1 \times 10^{15}$ instructions. Moreover, the instructions are of two types: algorithm integer instructions and floating point instructions. The instruction mix for the two types are determined to be 75% for the integer instructions and 25% for the floating point instructions. The second type of HI metric in this case is the instruction stride metric. This metric shows that on average there were 2.7 integer instructions between consecutive floating point instructions.

For the hardware, the following hardware characteristics were collected. The hardware includes a single core and has an operating speed of 0.5 GHz. Moreover, the hardware has two processing units. One of the processing units is an integer unit, which takes two cycles to execute an integer arithmetic operation. The other processing unit is a floating point unit, which takes 9 cycles to execute a floating point operation.

Based on the above HI metrics for the program code and hardware characteristics for the hardware, the total cycles for executing the program code on the hardware can be predicted using formula (2).

Formula (2)

$$\text{Total execution cycles} = (\text{total number of instructions}) \times \left( \frac{(\text{probability of floating point instruction}) \times (\text{cycles to execute floating point instruction})}{\text{number of integer instructions between floating point instructions}} + \frac{(\text{probability of integer instruction}) \times (\text{cycles to execute integer instruction})}{1} \right)$$

In some embodiments, if the hardware has more than one core, the reduction in execution cycles is almost inversely proportional to the number of cores. The total execution time can be predicted using the outcome of formula (2) and based on formula (3).

Total execution time=Total execution cycles×Time per cycle=Total execution cycles×1/Operating frequency  Formula (3)

Applying the above described HI metrics and hardware characteristics into formula (2) results in calculating a prediction for the total number of cycles for executing the program code on the hardware, as shown in calculation (4)

Calculation (4)

$$\text{Total execution cycles} = (1 \times 10^5) \times \left( \frac{0.25 \times 9}{2.7} + \frac{0.75 \times 2}{1} \right) = 23{,}333 \text{ cycles}$$

Applying the operating frequency of the hardware to the above result based on formula (3) provides the total predicted execution time for the program code on the hardware, as shown in calculation (5)

Total execution time=23,333×1/(0.5×10$^9$)~47 ns    Calculation (5)

Various embodiments may utilize similar techniques to predict the execution behavior of a program in whole or in part.

Figure 12:
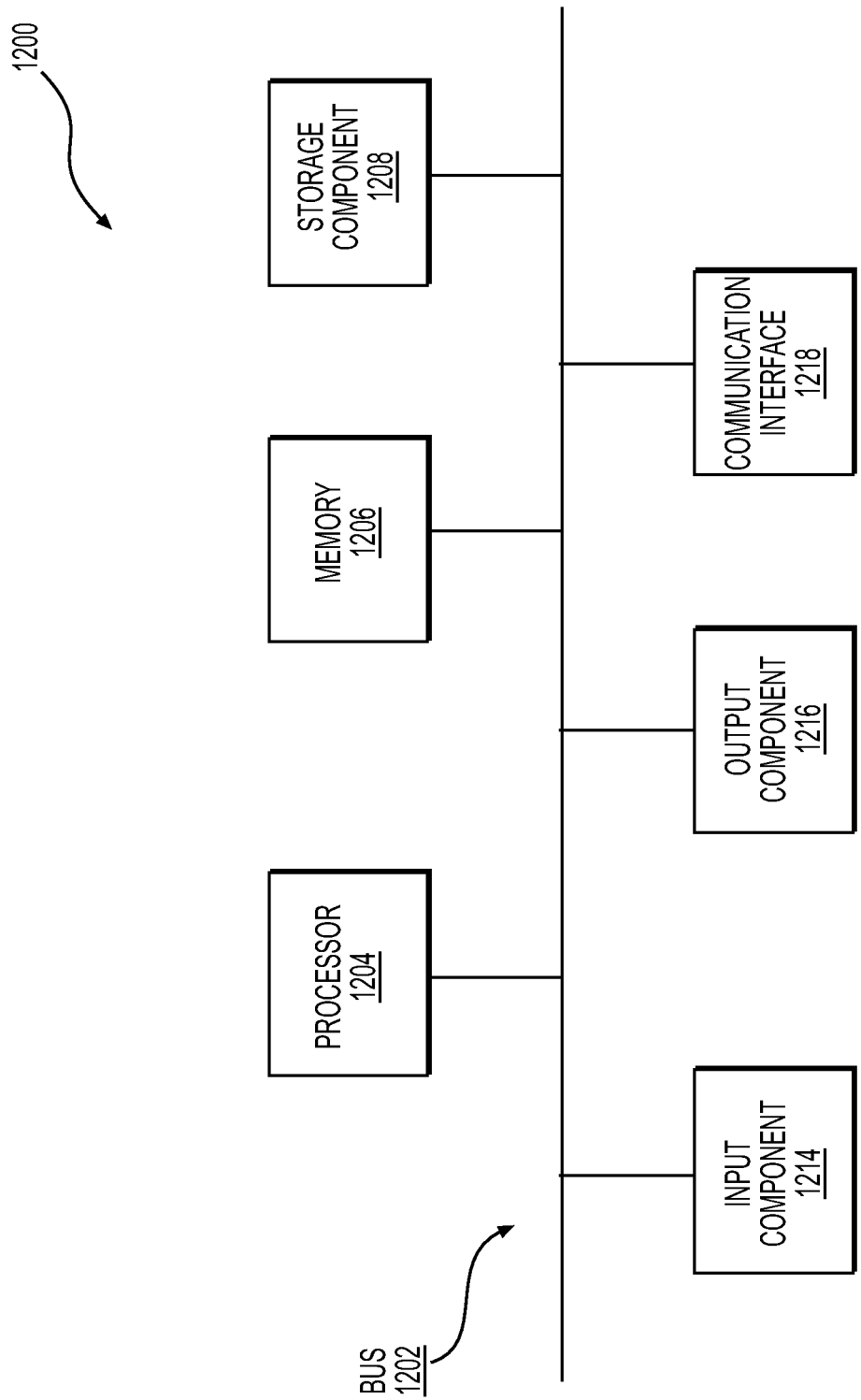
FIG. 12 shows a block diagram of a computing device according to some embodiments.

In various embodiments, a hardware system may include one or more computing devices. FIG. 12 shows a block diagram of a computing device 1200 according to some embodiments. Device 1200 may include a bus 1202, a processor 1204, a memory 1206, a storage component 1208, an input component 1214, an output component 1216, and a communication interface 1218. One or more of the components in device 1200 may be implemented locally or remotely via cloud computing technologies.

Bus 1202 may include a component that permits communication among components of device 1200. Processor 1204 may include a central processing unit (CPU), a graphics processing unit (GPU), an accelerated processing unit (APU), a microprocessor, or another type of processing component (e.g., a field-programmable gate array (FPGA), an application-specific integrated circuit (ASIC), etc.), and so on. Processor 1204 may be configured to interpret or execute instructions, or may be designed to implement one or more computing tasks. In some embodiments, processor 1204 may include multiple processor cores for parallel computing.

Memory 1206 may include a random access memory (RAM), a read only memory (ROM), or another type of dynamic or static storage device (e.g., a flash memory, a magnetic memory, an optical memory, and so on). Memory 1206 may be configured to store information or instructions for use by processor 1204.

Storage component 1208 may store information or software related to the operation and use of device 1200. For example, storage component 1208 may include a hard disk (e.g., a magnetic disk, an optical disk, a magneto-optic disk, a solid state disk, and so on), a compact disc (CD), a digital versatile disc (DVD), a floppy disk, a cartridge, a magnetic tape, or another type of computer-readable medium, along with a corresponding drive.

Input component 1214 may include a component that permits device 1200 to receive information, e.g., through user input. For example, input component 1214 may include a touch screen display, a keyboard, a keypad, a mouse, a button, a switch, a microphone, and so on. Additionally, or alternatively, input component 1214 may include a sensor for sensing information (e.g., a global positioning system (GPS) component, an accelerometer, a gyroscope, an actuator, and so on).

Output component 1216 may include a component that provides output information from device 1200. For example, output component 1216 may include a display, a speaker, a printer, one or more light-emitting diodes (LEDs), and so on.

Communication interface 1218 may include a transceiver-like component (e.g., a transceiver, a separate receiver and transmitter, and so on) that enables device 1200 to communicate with other devices. The communication may be, for example, via a wired connection, a wireless connection, or a combination of wired and wireless connections. Communication interface 1218 may permit device 1200 to receive information from another device or provide information to another device. For example, communication interface 1218 may include an Ethernet interface, an optical interface, a coaxial interface, an infrared interface, a radio frequency (RF) interface, a universal serial bus (USB) interface, a Wi-Fi interface, a cellular network interface, or the like.

Device 1200 may perform one or more processes described herein. Device 1200 may perform these processes in response to processor 1204 executing software instructions stored by a computer-readable medium, such as one or both of memory 1206 and storage component 1208. A computer-readable medium is defined herein as a non-transitory memory device. A memory device may include memory space within a single physical storage device or memory space spread across multiple physical storage devices.

Software instructions may be read into memory 1206 or storage component 1208 from another computer-readable medium, or from another device via communication interface 1218. When executed, software instructions stored in memory 1206 or storage component 1208 may cause processor 1204 to perform one or more processes described herein. Additionally, or alternatively, hardwired circuitry may be used in place of or in combination with software instructions to perform one or more processes described herein. Thus, unless stated explicitly or deductible from the context, implementations described herein are not limited to any specific combination of hardware circuitry and software.

The number and arrangement of components shown in FIG. 12 is provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

Figure 13:
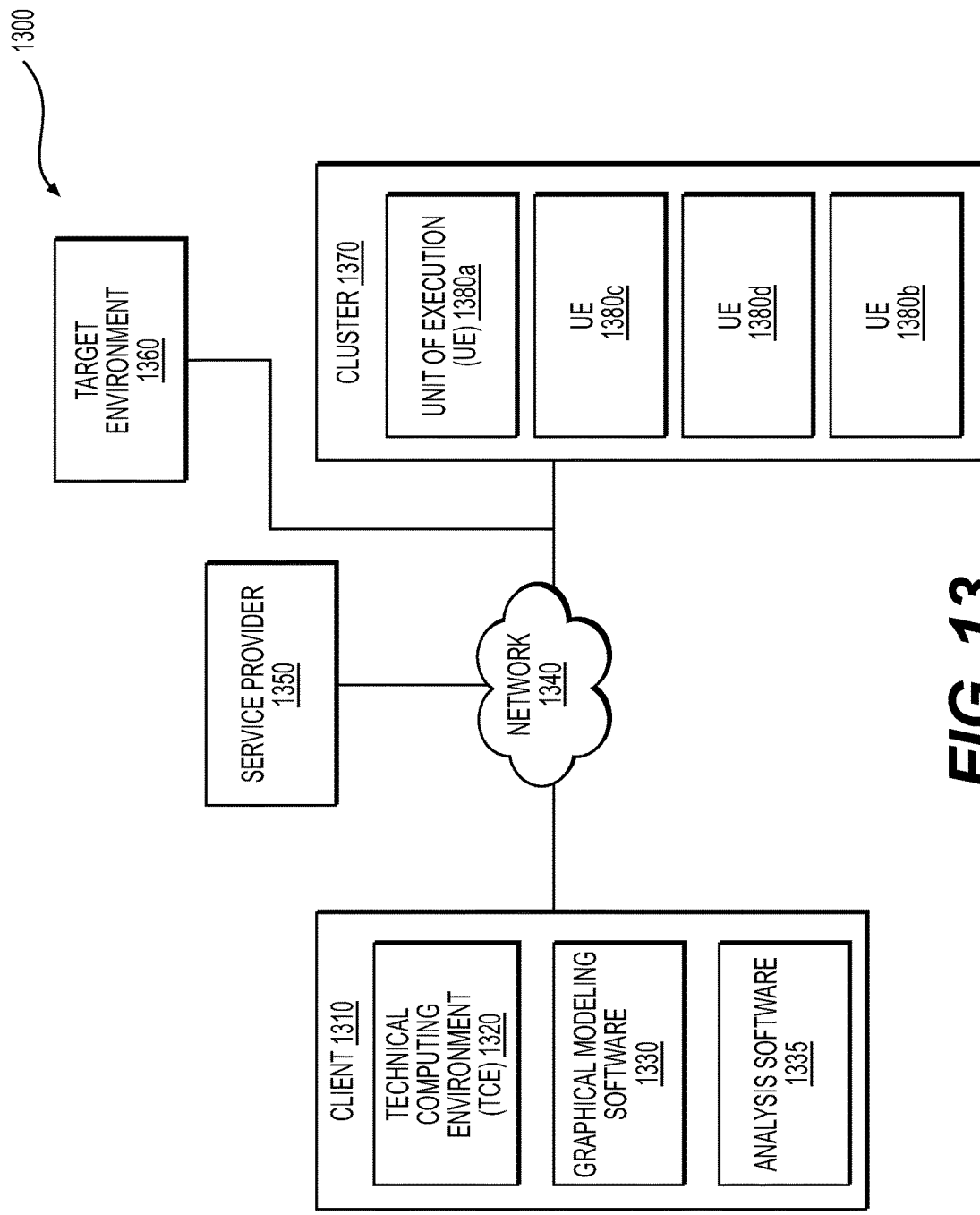
FIG. 13 illustrates a distributed environment that may be configured to practice an exemplary embodiment.

Some embodiments utilize a distributed system. FIG. 13 shows a distributed environment 1300 that may be configured to practice an exemplary embodiment. Referring to FIG. 13, environment 1300 may include a client 1310, network 1340, service provider 1350, target environment 1360, and cluster 1370. The distributed environment illustrated in FIG. 13 may be one example of a distributed environment that may be used. Other distributed environments may include additional devices, fewer devices, or devices in arrangements that differ from the arrangement of environment 1300.

Client 1310 may include a device capable of sending or receiving information (e.g., data) to or from another device, such as target environment 1360. Information may include any type of machine-readable information having substantially any format that may be adapted for use, e.g., in one or more networks or with one or more devices. The information may include digital information or analog information. The information may further be packetized or non-packetized.

Client 1310 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities or generate one or more results.

In an embodiment, client 1310 may include a technical computing environment (TCE) 1320, graphical modeling software 1330, or analysis software 133. TCE 1320 may include a graphical block diagram environment that may be used to execute models and manipulate the models in accordance with techniques described herein. In other embodiments, client 1310 may include other components, applications, etc. Embodiments of TCE 1320 may include computer-executable instructions (e.g., code) and data that are configured to implement the TCE. The instructions may include instructions configured to implement modeling software 1320 or graphical analysis software 1335.

Modeling software 1330 or the analysis software 1335 may be graphical, textual or a hybrid that includes both textual and graphical capabilities/features. Modeling software 1330 may include computer-executable instructions that allow, e.g., a user to build or execute a model. For example, modeling software 1330 may allow a user to build and execute a time-based model, a state-based model, an event-based model, a dataflow-based model, etc.

Analysis software 1335 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an exemplary embodiment, analysis software 1335 may include the Simulink® Design Verifier software which is available from The MathWorks.

Network 1340 may include any network capable of exchanging information between entities associated with the network, including, for example, client 1310, service provider 1350, target environment 1360, or cluster 1370. Exchanged information may include, for example, packet data or non-packet data. Implementations of network 1340 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1340 may include various network devices, such as, for example, routers, switches, firewalls, servers, etc. Portions of network 1340 may be wired (e.g., using wired conductors, optical fibers, etc.) or wireless (e.g., free-space optical (FSO), radio frequency (RF), acoustic transmission paths, etc.). Portions of network 1340 may include a substantially open public network, such as the Internet. Portions of network 1340 may include a more restricted network, such as a virtual private network (VPN). It should be noted that implementations of networks or devices operating on networks described herein are not limited with regards to information carried by the networks, protocols used in the networks, the architecture/configuration of the networks, etc.

Service provider 1350 may include logic (e.g., software) that makes a service available to another device in distributed environment 1300. Service provider 1350 may include a server operated by an entity (e.g., an individual, a corporation, an educational institution, a government agency, etc.) that provides one or more services to a destination, such as client 1310. The services may include software containing computer-executable instructions that may be executed, in whole or in part, by a destination, by service provider 1350 on behalf of the destination, or some combination thereof.

For example, in an embodiment, service provider 1350 may provide one or more subscription-based services to various customers via network 1340. These services may be accessed by the customer (e.g., via client 1310). Service provider 1350 may limit access to certain services based on, e.g., a customer service agreement between the customer and service provider 1350. The service agreement may allow the customer to access services that enable the customer to build or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee that provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1360 may include a device that receives information from client 1310, service provider 1350, or cluster 1370. For example, target environment 1360 may receive executable code from client 1310, where the executable code allows target environment to perform an operation when the code is executed. Client 1310 may have generated the executable code using TCE 1320, graphical modeling software 1330, or a code generator (not shown in FIG. 13).

Cluster 1370 may include a number of processing resources that perform processing on behalf of another device, such as client 1310, service provider 1350, or target environment 1360. Cluster 1370 may include logic that manages or coordinates the operation of multiple processing resources. For example, cluster 1370 may send data to or receive results from these processing resources. In an embodiment, cluster 1370 may include units of execution (UEs) 1380*a, b, c*, and *d* (collectively UEs 1380) that may perform processing on behalf of client 1310 or another device, such as service provider 1350.

UEs 1380 may include hardware, software, or hybrid logic that perform processing operations on behalf of TCE 1320. For example, in an embodiment UEs 1380 may parallel process portions of a graphical model created by user of client 1310. This parallel processing may include performing analysis on the model, parsing the model into portions, or aggregating results from respective UEs 1380 into a single result for display to a user at client 1310. UEs

1380 may reside on a single device or chip, or on multiple devices or chips. For example, UEs 1380 may be implemented in a single application specific integrated circuit (ASIC) or in multiple ASICs. Likewise, UEs 1380 can be implemented in a single computer system using virtualization techniques. Other examples of UEs 1380 may include field programmable gate arrays (FPGAs), complex programmable logic devices (CPLDs), application specific instruction-set processors (ASIPs), microprocessors, etc.

The illustrative embodiment may also be applied to a block diagram modeling environment, such as time-based block diagrams, state-based and flow diagrams, and dataflow diagrams. An exemplary block diagram modeling environment can be found in The Simulink environment, from The MathWorks, Inc. of Natick, Mass. The Simulink environment provides tools for modeling and simulating a variety of dynamic systems in one integrated, graphical environment. The Simulink environment enables users to design a block diagram for a target system, simulate the system's behavior, analyze the performance of the system, and refine the design of the system. The Simulink environment allows users to design target systems through a user interface that allows drafting of block diagram models of the target systems. The Simulink environment includes a block diagram editor that allows users to perform such actions as draw, edit, annotate, save, and print out block diagram representations of target systems. The block diagram editor is a graphical user interface (GUI) component that allows drafting of block diagram models by users.

In the Simulink environment, there is also a textual interface with a set of commands that allow interaction with the graphical editor, such as the textual interface provided in the MATLAB environment. Using this textual interface, users may write scripts that perform operations on the block diagram. The Simulink environment also allows users to simulate the designed target systems to determine the behavior of the systems. The Simulink environment includes a block diagram execution engine that carries out the task of compiling and linking the block diagram to produce an "in-memory executable" version of the model that is used for generating code or simulating a block diagram model. Simulink Blocksets provide application specific blocks that support the design of models. The Blocksets provide utilities for the development and integration of models for systems and sub-systems of the systems. The Blocksets may include Aerospace Blockset, Signal Processing Blockset, etc.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or" is often used not exclusively, but inclusively to mean and/or. Moreover, as used in this disclosure, a subset of a set may include one or more than one, including all, members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method comprising:
   executing, via one or more processors, program code for a plurality of times;
   collecting, via the one or more processors, one or more values of one or more hardware dependent metrics for the program code, the one or more hardware dependent metrics including a first hardware dependent metric and a second hardware dependent metric;
   measuring one or more changes in values of the one or more hardware dependent metrics during the executing of the program code for the plurality of times, including a first change in value of the first hardware dependent metric and a second change in value of the second hardware dependent metric;
   identifying an execution anomaly based on the one or more changes in values of the one or more hardware dependent metrics wherein:
     the one or more changes in values of the one or more hardware dependent metrics each correspond to an increase or a decrease in one or more values of the one or more hardware dependent metrics during the executing of the program code for the plurality of times;
     the first change in value of the first hardware dependent metric is correlated to the second change in value of the second hardware dependent metric;
     the first change in value of the first hardware dependent metric and the second change in value of the second hardware dependent metric result from the executing, for the plurality of times, of one or more instructions of the program code;
     the execution anomaly relates to a hardware related optimization used when executing the one or more instructions of the program code, that causes an overall performance issue in the executing of the program code; and
   modifying the program code, wherein the modifying removes the execution anomaly from the program code and improves the overall performance issue in the executing of the program code wherein the overall performance issue comprises a slow down in executing the program code, and improving the overall performance issue comprises speeding up the executing of the program code.

2. The method of claim 1, wherein the one or more values of the one or more hardware dependent metrics include at least one of:

a number of instructions retired;
a number of cache hits;
a number of cache misses;
a number of branch mispredictions; and
a number of cycles.

3. The method of claim 1, wherein the modification includes one or more of:
reordering a section of the program code;
introducing a delay in the program code;
reordering access to data structures in a memory; and
reducing a number of branch conditions.

4. The method of claim 1, wherein the execution anomaly includes a timing anomaly compromising:
a fluctuation in a duration of executing a part of the program code.

5. The method of claim 4, wherein the timing anomaly includes a delay in executing the program code;
and the method further comprises:
addressing the timing anomaly, wherein the addressing reduces the delay.

6. The method of claim 1, wherein identifying the execution anomaly includes identifying a memory event associated with the program code.

7. The method of claim 6, wherein the memory event includes a cache miss associated with a section of the program code.

8. The method of claim 1, wherein identifying the execution anomaly includes identifying a branch misprediction.

9. A non-transitory computer-readable medium storing instructions for one or more processors to execute a method comprising:
executing, via one or more processors, program code for a plurality of times;
collecting, via the one or more processors, one or more values of one or more hardware dependent metrics for the program code, the one or more hardware dependent metrics including a first hardware dependent metric and a second hardware dependent metric;
measuring one or more changes in values of the one or more hardware dependent metrics during the executing of the program code for the plurality of times, including a first change in value of the first hardware dependent metric and a second change in value of the second hardware dependent metric;
identifying an execution anomaly based on the one or more changes in values of the one or more hardware dependent metrics wherein:
the one or more changes in values of the one or more hardware dependent metrics each correspond to an increase or a decrease in one or more values of the one or more hardware dependent metrics during the executing of the program code for the plurality of times;
the first change in value of the first hardware dependent metric is correlated to the second change in value of the second hardware dependent metric;
the first change in value of the first hardware dependent metric and the second change in value of the second hardware dependent metric result from the executing, for the plurality of times, of one or more instructions of the program code;
the execution anomaly relates to a hardware related optimization used when executing the one or more instructions of the program code, that causes an overall performance issue in the executing of the program code; and
modifying the program code, wherein the modifying removes the execution anomaly from the program code and improves the overall performance issue in the executing of the program code wherein the overall performance issue comprises a slow down in executing the program code, and improving the overall performance issue comprises speeding up the executing of the program code.

10. A method comprising:
collecting one or more values of one or more hardware independent metrics for program code wherein the one or more values of the one or more hardware independent metrics include total number of instructions, probability of floating point instruction, cycles to execute floating point instruction, number of integer instructions between floating point instructions, probability of integer instruction, and cycles to execute integer instruction;
receiving one or more hardware characteristics of a computing device;
estimating, based on the one or more values of the one or more hardware independent metrics, total execution cycles for the program code wherein the estimating includes:
calculating a first estimated number for execution cycles for executing floating instructions in the program code;
calculating a second estimated number for execution cycles for executing integer instructions in the program code;
combining the first estimated number and the second estimated number;
estimating, based on the one or more hardware characteristics, a time per execution cycle for the program code; and
estimating, based on the total execution cycles and the time per execution cycle, a duration for execution of the program code on the computing device;
choosing, based on the estimated duration for execution of the program code on the computing device, a hardware architecture that will meet a desired execution duration
executing the program code on the chosen hardware architecture.

11. The method of claim 10, wherein the one or more hardware independent metrics include at least one of:
an instruction mix;
an instruction-level parallelism factor;
a register traffic;
a working-set size;
a data stream stride;
and a branch ability.

12. The method of claim 10, wherein the one or more hardware characteristics include one or more of:
a number of cores;
a core frequency;
a bus type;
a bus speed;
and a memory hierarchy.

13. The method of claim 12, wherein the memory hierarchy includes one or more of:
a number of cache levels;
a size of caches;
a cache eviction policy,
a type of caches,
a size of main memory;
and a cache coherency protocol used.

14. The method of claim 10, wherein the one or more values of the one or more hardware independent metrics are collected statically.

15. The method of claim 14, wherein collecting the one or more values of one or more hardware independent metrics comprises:
- compiling the program code to produce compiled program code;
- analyzing the compiled program code; and
- deriving a subset of the one or more values of the one or more hardware independent metrics.

16. The method of claim 10, wherein the one or more values of the one or more hardware independent metrics are collected dynamically.

17. The method of claim 16, wherein:
- collecting the one or more values of one or more hardware independent metrics comprises:
- executing at least part of the program code on the computing device; and
- determining a subset of the one or more values of the one or more hardware independent metrics, wherein the determining is based on the executing.

18. The method of claim 16, wherein:
- the computing device is a first computing device; and
- collecting the one or more values of the one or more hardware independent metrics comprises:
- executing at least part of the program code on a second computing device; and
- determining a subset of the one or more values of the one or more hardware independent metrics,
- wherein the determining is based on the executing.

* * * * *